(12) United States Patent
Torimoto et al.

(10) Patent No.: US 8,618,978 B2
(45) Date of Patent: Dec. 31, 2013

(54) POSITION INFORMATION PROVIDING SYSTEM INDOOR TRANSMITTER AND METHOD FOR PROVIDING POSITION INFORMATION

(75) Inventors: Hideyuki Torimoto, Tokyo (JP); Makoto Ishii, Tokyo (JP); Masahiro Asako, Tokyo (JP); Dinesh Manandhar, Tokyo (JP); Satoshi Kogure, Tsukuba (JP); Tomoyuki Miyano, Tsukuba (JP); Motohisa Kishimoto, Tsukuba (JP); Hiroaki Maeda, Yokohama (JP)

(73) Assignees: GNSS Technologies Inc., Tokyo (JP); Lighthouse Technology & Consulting Co., Ltd., Kanagawa (JP)

( * ) Notice: Subject to any disclaimer, the term of this patent is extended or adjusted under 35 U.S.C. 154(b) by 441 days.

(21) Appl. No.: 12/745,478
(22) PCT Filed: Nov. 27, 2008
(86) PCT No.: PCT/JP2008/071550
§ 371 (c)(1), (2), (4) Date: Nov. 19, 2010
(87) PCT Pub. No.: WO2009/069700
PCT Pub. Date: Jun. 4, 2009

(65) Prior Publication Data
US 2011/0050493 A1    Mar. 3, 2011

(30) Foreign Application Priority Data
Nov. 30, 2007 (JP) ................... 2007-310350

(51) Int. Cl.
G01S 19/48    (2010.01)
(52) U.S. Cl.
USPC ........................................ 342/357.31
(58) Field of Classification Search
USPC ........................................ 342/357.31
See application file for complete search history.

(56) References Cited

U.S. PATENT DOCUMENTS 4,536,872 A * 8/1985 Lahti ............................ 370/470
6,101,178 A * 8/2000 Beal ......................... 342/357.31

(Continued)

FOREIGN PATENT DOCUMENTS

EP        2012136 A1    1/2009
JP    2004-132750 A    4/2004

(Continued)

OTHER PUBLICATIONS

J.J. Spilker Jr., GPS Signal Structure and Theoretical Performance, in B.W. Parkinson et al., Global Positioning System: Theory and Applications, vol. 1; Progress in Astronautics and Aeronautics, vol. 163, American Institute of Aeronautics and Astronautics, Inc., p. 57 and 82, 1996.*
L. Bogan, Global Positioning System: GPS How it Works, Halifax RASC, Dec. 18, 1998.*
Patent Abstracts of Japan, Publication No. 2006-067086, dated Mar. 9, 2006, 1 page.

(Continued)

Primary Examiner — Jack W Keith
Assistant Examiner — Fred H Mull
(74) Attorney, Agent, or Firm — Osha Liang LLP

(57) ABSTRACT

Provided is a position information providing system which can reduce a time required for acquiring position information. An indoor transmitter is adapted to provide position information by using a second positioning signal compatible with a first positioning signal which is a spread spectrum signal from each of a plurality of satellites. The indoor transmitter includes an EEPROM which stores therein position data for identifying an installation location thereof, an FPGA operable to generate a second positioning signal including the position data as a spread spectrum signal, and a transmitting section operable to transmit the spread spectrum signal. The second positioning signal is generated to repeat the same content in a cycle shorter than that of the first positioning signal.

12 Claims, 26 Drawing Sheets

(56) References Cited

U.S. PATENT DOCUMENTS

| | | | |
|---|---|---|---|
| 8,174,439 | B2 | 5/2012 | Torimoto et al. |
| 2006/0159055 | A1* | 7/2006 | Turunen .................. 370/342 |
| 2009/0115661 | A1 | 5/2009 | Torimoto et al. |
| 2010/0290504 | A1 | 11/2010 | Torimoto et al. |

FOREIGN PATENT DOCUMENTS

| | | |
|---|---|---|
| JP | 2006-067086 A | 3/2006 |
| JP | 2007-278756 A | 10/2007 |
| JP | 2009085928 A | 4/2009 |
| WO | 9948233 A1 | 9/1999 |
| WO | 2006074959 A2 | 7/2006 |
| WO | 2007/119645 A1 | 10/2007 |
| WO | WO 2009/008862 A1 * | 1/2009 |

OTHER PUBLICATIONS

Patent Abstracts of Japan, Publication No. 2007-278756, dated Oct. 25, 2007, 1 page.
Patent Abstracts of Japan, Publication No. 2004-132750, dated Apr. 30, 2004, 1 page.
International Search Report issued in PCT/JP2008/071550, mailed on Feb. 24, 2009, 8 pages.
Written Opinion issued in PCT/JP2008/071550, mailed on Feb. 24, 2009, 8 pages.
European Search Report Issued in European Application No. 08854945.6-2220, Dated Aug. 12, 2011 (7 Pages).
Office Action in corresponding Japanese Application No. 2007-310350 dated May 13, 2013 (4 pages).
Espacenet, Patent Abstract for Japanese Publication No. 2009085928 dated Apr. 23, 2009 (2 pages).

* cited by examiner

FIG.6

| Message-Type ID (MID) | Frame Length (Word) | Counter | Minimum Repetitive Cycle (sec) |
|---|---|---|---|
| 0 ("000") | 3 | position information 1 | 12 |
| 1 ("001") | 4 | position information 2 | |
| 2 ("010") | — | reserve | — |
| 3 ("011") | 1 | short ID | 6 |
| 4 ("100") | 2 | medium ID | 12 |
| 5 ("101") | — | reserve | 24 |
| 6 ("110") | — | reserve | — |
| 7 ("111") | — | reserve | — |

FIG.8

| # | Contents | Bit Length | LSB | | Range | | |
|---|---|---|---|---|---|---|---|
| | | | | | Minimum Value | ~ | Maximum Value |
| 1 | Floor (n-th) | 7 | 1st floor | | - 26th floor | ~ | 100th floor |
| 2 | Latitude | 22 | 4.3 E - 0.5 degrees | (4.78m) | - 90 degrees | ~ | 90 degrees |
| 3 | Longitude | 23 | 4.3 E - 0.5 degrees | (4.78m) | - 180 degrees | ~ | 180 degrees |

Fig.10

| # | Contents | Bit Length | LSB | | Range | | |
|---|---|---|---|---|---|---|---|
| | | | | | Minimum Value | ~ | Maximum Value |
| 1 | Floor (n-th) | 9 | 1st floor | | - 26th floor | ~ | 100th floor |
| 2 | Latitude | 23 | 2.1 E - 0.5 degrees | (2.39m) | - 90 degrees | ~ | 90 degrees |
| 3 | Longitude | 24 | 2.1 E - 0.5 degrees | (2.39m) | - 180 degrees | ~ | 180 degrees |
| 4 | Altitude | 12 | 1m | | −95m | ~ | 4000m |

FIG.22

| # | Contents | Bit Length | LSB | | Range | | |
|---|---|---|---|---|---|---|---|
| | | | | | Minimum Value | ~ | Maximum Value |
| 1 | Floor (n-th) | 8 | 1st floor | | -50th floor | ~ | 204th floor |
| 2 | Latitude | 23 | 2.1 E - 0.5 degrees | (2.39m) | -90 degrees | ~ | 90 degrees |
| 3 | Longitude | 24 | 2.1 E - 0.5 degrees | (2.39m) | -180 degrees | ~ | 180 degrees |

FIG.24

| # | Contents | Bit Length | LSB | | Range | | |
|---|---|---|---|---|---|---|---|
| | | | | | Minimum Value | ~ | Maximum Value |
| 1 | Floor (n-th) | 9 | 1st floor | | - 50th floor | ~ | 205th floor |
| 2 | Latitude | 24 | 1.1 E - 0.5 degrees | (1.19m) | - 90 degrees | ~ | 90 degrees |
| 3 | Longitude | 25 | 1.1 E - 0.5 degrees | (1.19m) | - 180 degrees | ~ | 180 degrees |
| 4 | Altitude | 12 | 1m | | −95m | ~ | 4000m |

POSITION INFORMATION PROVIDING SYSTEM INDOOR TRANSMITTER AND METHOD FOR PROVIDING POSITION INFORMATION

TECHNICAL FIELD

The present invention relates to a technique for providing position information. More specifically, the present invention relates to a technique capable of providing position information even under an environment impeding the penetration of a signal emitted from a satellite which emits a positioning signal.

BACKGROUND ART

As a conventional position determination system, a GPS (Global Positioning System) is known. A satellite for emitting a signal for use in the GPS (the satellite and the signal will hereinafter be referred to respectively as "GPS satellite" and "GPS signal") is flying at an attitude of about twenty thousand km from the ground. Any user is allowed to receive the signal emitted from the GPS satellite so as to measure a distance between the GPS satellite and the user through demodulation of the received signal. Thus, as long as there is no obstacle between the ground and the GPS satellite, position determination can be performed using the signal emitted from the GPS satellite. However, in cases where the GPS is used, for example, in an urban area, a forest of buildings often becomes obstacle to cause a situation where a position information providing apparatus of a user cannot receive the signal emitted from the GPS satellite. Further, depending on conditions, a signal diffraction or reflection often occurs due to the buildings to cause an error in distance measurement using the signal, which leads to deterioration in accuracy of position determination.

Although there is a technique of receiving in an indoor area a weak GPS signal which has penetrated through a wall or roof, a receiving state is still unstable, which causes deterioration in accuracy of position determination.

While the above description has been made about position determination by taking the GPS as an example, the aforementioned phenomena are observed in a satellite-based positioning system in general. As used herein, the term "satellite-based positioning system" means any type of satellite-based positioning system including GLONASS (GLObal NAvigation Satellite System) in Russian Federation, and Galileo in Europe, as well as the GPS.

A technique related to a position information providing system is disclosed, for example, in JP 2006-67086A (Patent Document 1).

However, in a technique disclosed in the JP 2006-67086A, there is a problem that it lacks versatility, because a reader or a writer is unique as an element of a position information providing system. Moreover, due to a need for limiting a transmitter output to avoid interference, a receivable range for position information is restricted, which causes a problem that it is unable to continuously acquire position information, or an extremely large number of transmitters are required to cover a wide range.

In a conventional mobile phone having a position determination function, position information can be acquired in a location where it is possible to receive a signal from a satellite, so that a position of the mobile phone can be notified. However, in a location where it is impossible to receive radio waves, such as an inside area of a building or an underground shopping area, there is a problem of being unable to acquire position information.

As measures for this problem, for example, a technique is contemplated which is designed to arrange in an indoor area a plurality of transmitters each capable of emitting a signal similar to a GPS signal so as to calculate a position based on the trilateration principle as in the GPS. However, in this case, there is a problem of an increase in cost of the transmitters due to a need for allowing respective clock times of the transmitters to be in synchronization with each other.

Moreover, a radio wave propagation becomes complicated due to reflection in the indoor area, which causes another problem that an error of about several tens of meters easily occurs despite the installation of such costly transmitters.

JP 2007-278756A (Patent Document 2) discloses a position information providing system capable of seamlessly acquiring position information in indoor and outdoor areas, wherein position information (latitude, longitude, altitude, etc.) itself about an installation location of an indoor transmitter is transmitted in the same format as a conventional format of a signal from a GPS satellite, and a conventional configuration for position determination based on GPS satellites is used as hardware of a GPS receiver without modification.

Patent Document 1: JP 2006-67086A
Patent Document 2: JP 2007-278756A

DISCLOSURE OF THE INVENTION

Problem to be Solved by the Invention

Meanwhile, there is an increasing need to accurately acquire position information in both outdoor and indoor areas.

More specifically, in regard to acquisition or notification of position information, for example, in a fixed-line phone, a caller position can be identified by a call sent out from the fixed-line phone, because an installation location thereof is preliminarily known. However, along with popularization of mobile phones, mobile communications have become popular more and more. Thus, it often becomes unable to notify caller position information in the same manner as that in the fixed-line phone. Further, as to a message in an emergency, the development of laws toward including position information in a message from a mobile phone is being promoted.

However, in cases where an indoor transmitter is used to provide position information to a position information providing apparatus, e.g., a mobile phone having a position determination function, it is not exactly clear in what kind of signal format a signal should be transmitted to allow errors in signal synchronization and capture to be suppressed.

In an indoor area, as compared with a signal from a satellite, a signal having a sufficient intensity can be broadcasted. Thus, it is expected that synchronization and capture can be performed in a shorter period of time than that for the signal from the satellite. However, there is a problem that it is not exactly clear what kind of signal format is suitable therefor.

Therefore, there is a need for a position information providing system capable of providing position information without deterioration in accuracy even in a location where it is impossible to receive radio waves from a satellite which emits a signal for position determination.

There is another need for a position information providing system capable of suppressing a cost of a transmitter adapted to emit a signal for position determination.

There is yet another need for a position information providing system capable of reducing a time required until position information is acquired.

Therefore, there is still another need for an indoor transmitter capable of transmitting a signal for providing position information, without deterioration in accuracy even in a location where it is impossible to receive radio waves from a satellite which emits a signal for position determination.

There is yet still another need for an indoor transmitter capable of suppressing a cost of a transmitter adapted to emit a signal for position determination.

There is another further need for an indoor transmitter capable of reducing a time required until position information is acquired.

Means for Solving the Problem

According to a first aspect of the present invention, there is provided a position information providing system capable of providing position information by use of a first positioning signal which is a spread spectrum signal from each of a plurality of satellites. The position information providing system comprises an indoor transmitter and a position information providing apparatus. The indoor transmitter includes a storage section which stores therein position data for identifying an installation location of the indoor transmitter, a generation section for generating an second positioning signal including the position data, as a spread spectrum signal, and a transmitting section for transmitting the generated spread spectrum signal. The position information providing apparatus includes a receiving section for receiving a spread spectrum signal, an identifying section for, based on a plurality of code patterns related to the first and second positioning signals, identifying one of the code patterns which corresponds to the spread spectrum signal received by the receiving section, a determining section for, based on a signal obtained by demodulating the received spread spectrum signal using the code pattern identified by the identifying section, determining which of the first and second positioning signals is received, a position information-deriving section for deriving position information of the position information providing apparatus, while switching between processing modes depending on a result of the determination, and an output section for outputting the position information derived by the position information-deriving section. The second positioning signal is configured to repeat a same content message in a cycle shorter than that of the first positioning signal.

Preferably, the second positioning signal comprises a plurality of frames each including a plurality of words each of which is a transmission unit of data to be subjected to error detection, wherein the number of the words included in each of the frames is variably set, and the words constituting each of the frames include a word having identification information indicative of the number of the words constituting the frame.

Preferably, the second positioning signal comprises a plurality of frames each including a plurality of words each of which is a transmission unit of data to be subjected to error detection, and wherein a leading one of the words in each of the frames includes a preamble for establishing frame synchronization during receiving, and the remaining words other than at least the leading word, in each of the frames, include count data which is updated every time the word data is generated.

Preferably, the first positioning signal comprises a plurality of first frames each including a plurality of first words each of which is a transmission unit of data to be subjected to error detection, wherein each of the first frames includes a first preamble for establishing frame synchronization during receiving.

Further, the second positioning signal preferably comprises a plurality of second frames each including a plurality of second words each of which is a transmission unit of data to be subjected to error detection, wherein each of the second frames includes a second preamble for establishing frame synchronization during receiving, and wherein the second preamble has a pattern different from that of the first preamble.

Preferably, the position information-deriving section is operable, when the second positioning signal transmitted from the indoor transmitter, to acquire the position data from a signal obtained through the demodulation, and, when a plurality of the first positioning signals are received without receiving the second positioning signal, to calculate the position information based on the plurality of received spread spectrum signals.

Preferably, the position information providing apparatus is adapted to be capable of communicating with a communicating apparatus for providing position-related information associated with identification data, via a communication line, and the position information-deriving section is operable, when the receiving section receives the second positioning signal, to communicate with the communication apparatus based on the identification data to acquire the position-related information associated with the identification data.

According to a second aspect of the present invention, there is provided an indoor transmitter capable of providing position information by use of a first positioning signal which is a spread spectrum signal from each of a plurality of satellites, and a second positioning signal compatible with the first positioning signal. The indoor transmitter comprises: a first storage section which stores therein position data for identifying an installation location of the indoor transmitter; a generation section for generating an second positioning signal including the position data, as a spread spectrum signal; and a transmitting section for transmitting the generated spread spectrum signal, wherein the generation section is adapted to generate the second positioning signal in such a manner as to repeat a same content message in a cycle shorter than that of the first positioning signal.

Preferably, in the indoor transmitter, the first positioning signal comprises a plurality of first frames each including a plurality of first words each of which is a transmission unit of data to be subjected to error detection, wherein each of the first frames includes a first preamble for establishing frame synchronization during receiving, and the second positioning signal comprises a plurality of second frames each including a plurality of second words each of which is a transmission unit of data to be subjected to error detection, wherein each of the second frames includes a second preamble for establishing frame synchronization during receiving, and wherein the second preamble has a pattern different from that of the first preamble.

Preferably, in the indoor transmitter, the generation section includes identification data associated with position-related information.

According to a third aspect of the present invention, there is provided a method of providing position information by use of a first positioning signal which is a spread spectrum signal from each of a plurality of satellites. The method comprises the step of loading position data for identifying an installation location of an indoor transmitter; the step of generating an second positioning signal including the position data, as a spread spectrum signal; the step of transmitting the generated spread spectrum signal; the step of receiving the transmitted spread spectrum signal; the step of, based on a plurality of code patterns related to the first and second positioning signals, identifying one of the code patterns which corresponds to the received spread spectrum signal; the step of, based on a signal obtained by demodulating the received spread spectrum signal using the identified code pattern, determining which of the first and second positioning signals is received; the step of deriving position information, while switching between processing modes depending on a result of the determination; and the step of outputting the derived position information, wherein the second positioning signal is generated to repeat a same content message in a cycle shorter than that of the first positioning signal.

BRIEF DESCRIPTION OF THE DRAWINGS

FIG. 6 is a table showing a comparison between a value of an MID (Massage-type ID) and a frame length/content.

FIG. 8 is a table showing respective examples of data contents in the frame, corresponding values of a bit length and an LSB (Least Significant Bit), and a range to be expressed.

FIG. 10 is a table showing respective examples of data contents, corresponding values of a bit length and an LSB (Least Significant Bit), and a range to be expressed.

FIG. 22 is a table showing respective examples of data contents, corresponding values of a bit length and an LSB (Least Significant Bit), and a range to be expressed.

FIG. 24 is a table showing examples of a data content, a bit length, a corresponding value of an LSB, and a range to be represented, in each frame.

EXPLANATION OF CODES

Figure 1:
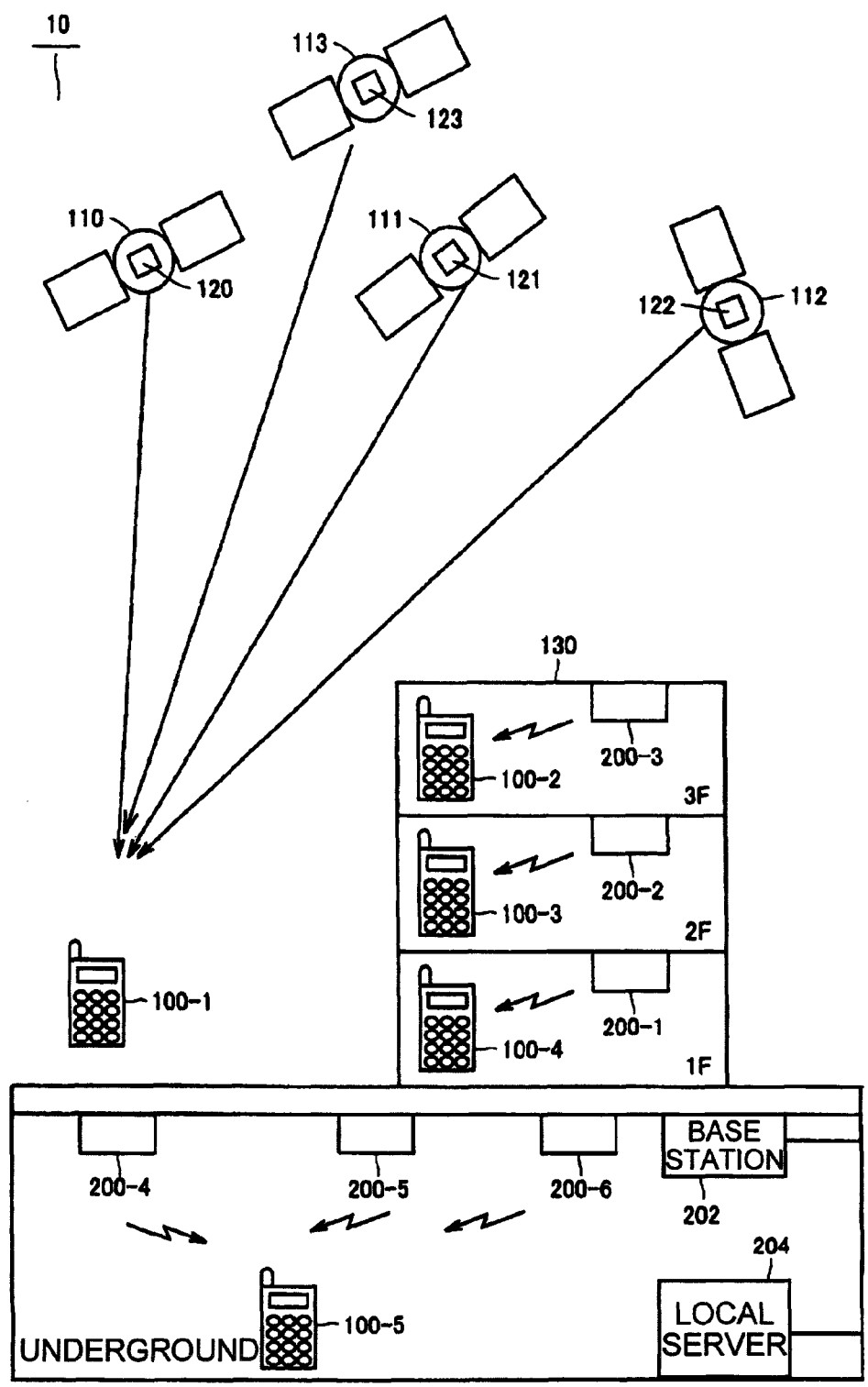
FIG. 1 is a diagram showing a configuration of a position information providing system according to a first embodiment of the present invention.

10: position information providing system
110, 111, 112: GPS satellite
120, 121, 122: transmitter
100-1, 100-2, 100-3, 100-4, 1000, 1160, 1170: position information providing apparatus
130: building
200-1, 200-2, 200-3, 1110, 1120, 1130, 1210: indoor transmitter
210: radio OF
220: external synchronous link port
221: external clock port
230: reference clock I/O block
240: digital processing block
250: analog block
1010, 1308: antenna
1140, 1150: region
1220: Internet
1380: memory card
1462: CD-ROM

BEST MODE FOR CARRYING OUT THE INVENTION

With reference to the drawings, the present invention will now be described based on an embodiment thereof. In the following description, a common reference numeral or code is assigned to the same elements or components. Such elements or components have the same name and function. Thus, duplicated detained description thereabout will be omitted.

First Embodiment

With reference to FIG. 1, a position information providing system 10 according to a first embodiment of the present invention will be described. FIG. 1 is a diagram showing a configuration of the position information providing system 10. The position information providing system 10 comprises a plurality of GPS (Global Positioning System) satellites 110, 111, 112, 113 each of which emits a signal for position determination (hereinafter referred to as "positioning signal") while flying at an attitude of about twenty thousand km from the ground, and a plurality of position information providing apparatuses 100-1 to 100-5 each of which functions as an apparatus for providing position information. When each of the position information providing apparatuses 100-1 to 100-5 is generically described, it will be referred to as "position information providing apparatus 100". For example, the position information providing apparatus 100 may be a terminal having a conventional position determination device, such as a mobile phone, a portable car navigation system or other mobile-body position determination apparatus.

As used herein, the term "positioning signal (position-determination signal)" means a spread spectrum signal, for example, a so-called "GPS signal". However, the positioning signal is not limited to the GPS signal. Although the following description will be made based on one example where the GPS is use as a position determination system, for ease of explanation, the present invention is also applicable to any other satellite-based position determination system (such as the Galileo or the QZSS (Quasi-Zenith Satellite System)).

For example, a center frequency of the positioning signal may be 1575.42 MHz. For example, a spreading frequency of the positioning signal may be 1.023 MHz. In this case, a frequency of the positioning signal becomes equal to that of a C/A (Coarse and Acquisition) signal in an existing GPS L1 band. Thus, a front-end of an existing positioning-signal receiving circuit (e.g., GPS signal receiving circuit) can be diverted, so that it becomes possible to allow the position information providing apparatus 100 to receive the positioning signal, only by changing software for processing a signal from the front-end without adding a new hardware circuit.

The positioning signal may be modulated with a 1.023 MHz rectangular wave. In this case, for example, if a data channel thereof is the same as that of a positioning signal which is newly planned to be transmitted in the L1 band, a user can receive the positioning signal using a receiver capable of receiving and processing the new GPS signal. A frequency of the rectangular wave is preferably 1.023 MHz. A frequency for the modulation may be set by trade-off with spectral separation for avoiding interference with other signals.

A transmitter 120 is mounted on the GPS satellite 110 to emit a positioning signal. Further, a transmitter (121, 122, 123) similar to the transmitter 120 is mounted on each of the GPS satellites 111, 112, 113.

Each of the position information providing apparatuses 100-2, 100-3, 100-4 having the same function as that of the position information providing apparatus 100-1 is usable even in a location where it is difficult for radio waves to penetrate, such as a building 130 or an underground shopping area, as described below.

In the building 130, an indoor transmitter 200-1 is attached to a ceiling of the 1st floor of the building 130. The position information providing apparatus 100-4 is operable to receive a positioning signal emitted from the indoor transmitter 200-1. In the same manner, two indoor transmitters 200-2, 200-3 are attached to ceilings of the 2nd and 3rd floors of the building 130, respectively. Each of the indoor transmitters 200-1 to 200-3 is operable to transmit therefrom information for directly identifying an installation location of the indoor transmitter, as described later.

In the underground shopping area, a plurality of indoor transmitters 200-4 to 200-6 are attached on a ceiling thereof. The position information providing apparatus 100-5 is operable to receive a positioning signal emitted from each of the indoor transmitters 200-4 to 200-6. In this case, each of the indoor transmitters 200-4 to 200-6 is also operable to transmit therefrom information for directly identifying an installation location of the indoor transmitter, as described later.

Alternatively, for example, a configuration may be employed in which a local server 204 is installed in the underground shopping area, and the each of the indoor transmitters 200-4 to 200-6 is operable to transmit therefrom identification information associated with an installation location of the indoor transmitter (i.e., information for indirectly identifying an installation location of the indoor transmitter), instead of an installation location itself of the indoor transmitter, as described later. Further, the position information providing apparatus 100-5 may be configured to send an inquiry about position-related information equivalent to the identification information, to the local server 204 via a base station 202 and a network (e.g., mobile phone network). In the building 130, the configuration adapted to send an inquiry about position-related information to a local server may be employed.

In cases where a plurality of indoor transmitters are installed in the same floor as in an underground shopping area, an output intensity of each of the indoor transmitters can be adjusted to limit a size of a region to be covered by one of the indoor transmitters. This makes it possible to eliminate a need for increasing an intensity of a signal to be transmitted from each of the indoor transmitters, and facilitate setting a transmission power to a value equal to or less than a law or regulations for regulating the use of radio waves, such as the Radio Law in Japan, so that specific authorization to the installation becomes unnecessary.

In the first embodiment, a clock time of each of the indoor transmitters 200-1, 200-2, 200-3 or the indoor transmitters 200-4, 200-5, 200-6 (the clock time will hereinafter be referred to as "ground clock time") and a clock time of each of the GPS satellites 110, 111, 112, 113 (the clock time will hereinafter be referred to as "satellite clock time") may be independent of each other, i.e., the ground clock time and the satellite clock time are not required to be synchronized with each other. However, the satellite clock times of the GPS satellites are required to be synchronized with each other. Thus, each of the satellite clock times is controlled by an atomic clock mounted on a respective one of the GPS satellites. According to need, the ground clock times as the clock times of the indoor transmitters 200-1, 200-2, 200-3 or the indoor transmitters 200-4, 200-5, 200-6 may be preferably synchronized with each other.

A spread spectrum signal to be emitted as a positioning signal from each of the transmitters of the GPS satellites is generated by modulating a navigation message with a PRN (Pseudo Random Noise) code. The navigation message includes clock time data, orbit data, almanac data and ionospheric correction data. Each of the transmitters 120 to 123 also holds data (PRN-ID (IDentification)) for identifying the transmitter (120 to 123) itself or the GPS satellite mounting the transmitter (120 to 123).

The position information providing apparatus 100 has data and a code generator for generating a plurality of types of pseudo random noise codes. The position information providing apparatus 100 is operable, in response to receiving a positioning signal, to perform an after-mentioned demodulation processing, using a code pattern of a pseudo random noise code (pseudo random noise code pattern) assigned to a respective one of the transmitters of the satellites or a respective one of the indoor transmitters, to identify from which of the satellites or the indoor transmitters the received signal is emitted. The PRN-ID is included in data of an L1C signal as one type of positioning signal, so that it is able to prevent signal capture/tracking using an erroneous code pattern which is liable to occur when a reception level is low. In contrast, the PRN-ID is not included in an L1C/A signal of the existing GPS.

[Transmitter Mounted on GPS Satellite]

A configuration of a transmitter to be mounted on a GPS satellite is well known. Thus, only the outline of the configuration of the transmitter mounted on the GPS satellite will be described below. Each of the transmitters 120, 121, 122, 123 comprises an atomic clock, a storage device for storing therein data, an oscillator circuit, a processing circuit for generating a positioning signal, an encoding circuit for subjecting the signal generated by the processing circuit to spread spectrum encoding, and a transmitting antenna. The storage device stores therein a navigation message including ephemeris data, almanac data of a respective one of the GPS satellites and ionospheric correction data, and a PRN-ID.

The processing circuit is operable to generate an outgoing message, using clock time information from the atomic clock, and the data stored in the storage device.

In the transmitters 120 to 123, a pseudo random noise code pattern for the spread spectrum encoding is pre-defined on a transmitter-by-transmitter basis. In order words, the code pattern is different on a transmitter-by-transmitter basis (i.e., on a GPS satellite-by-GPS satellite basis). The encoding circuit is operable to spectrum-spreading the message using the above pseudo random noise code. Each of the transmitters 120 to 123 is operable to convert the encoded signal into a high-frequency signal and emit the converted signal to outer space via the transmission antenna.

In the above manner, each of the transmitters 120 to 123 emits a spread spectrum signal causing no harmful interference with those of the remaining transmitters. The "causing no harmful interference" can be guaranteed by an output level limited to an extent causing no interference. Alternatively, it may also be achieved by spectral separation techniques. The spread spectrum signal is transmitted by a carrier wave, for example, called "L1 band". For example, each of the transmitters 120, 121, 122, 123 may be configured to emit a positioning signal having the same frequency according to a spread-spectrum communication scheme. Thus, even if respective positioning signals transmitted from the satellites are received by a same one (e.g., 100-1) of the position information providing apparatuses, they can be received without causing interference with each other.

In an outdoor area, the position information providing apparatus 100-1 can obtain three-dimensional position information, such as a latitude, a longitude and an altitude, thereof, by simultaneously receiving the positioning signals from the four satellites.

In regard to a positioning signal from the indoor transmitter on the ground, each of the signals from the plurality of indoor transmitters can be received without causing interference with the remaining signals, in the same manner as that in the signals transmitted from the satellites.

[Hardware Configuration of Indoor Transmitter 200-1]

Figure 2:
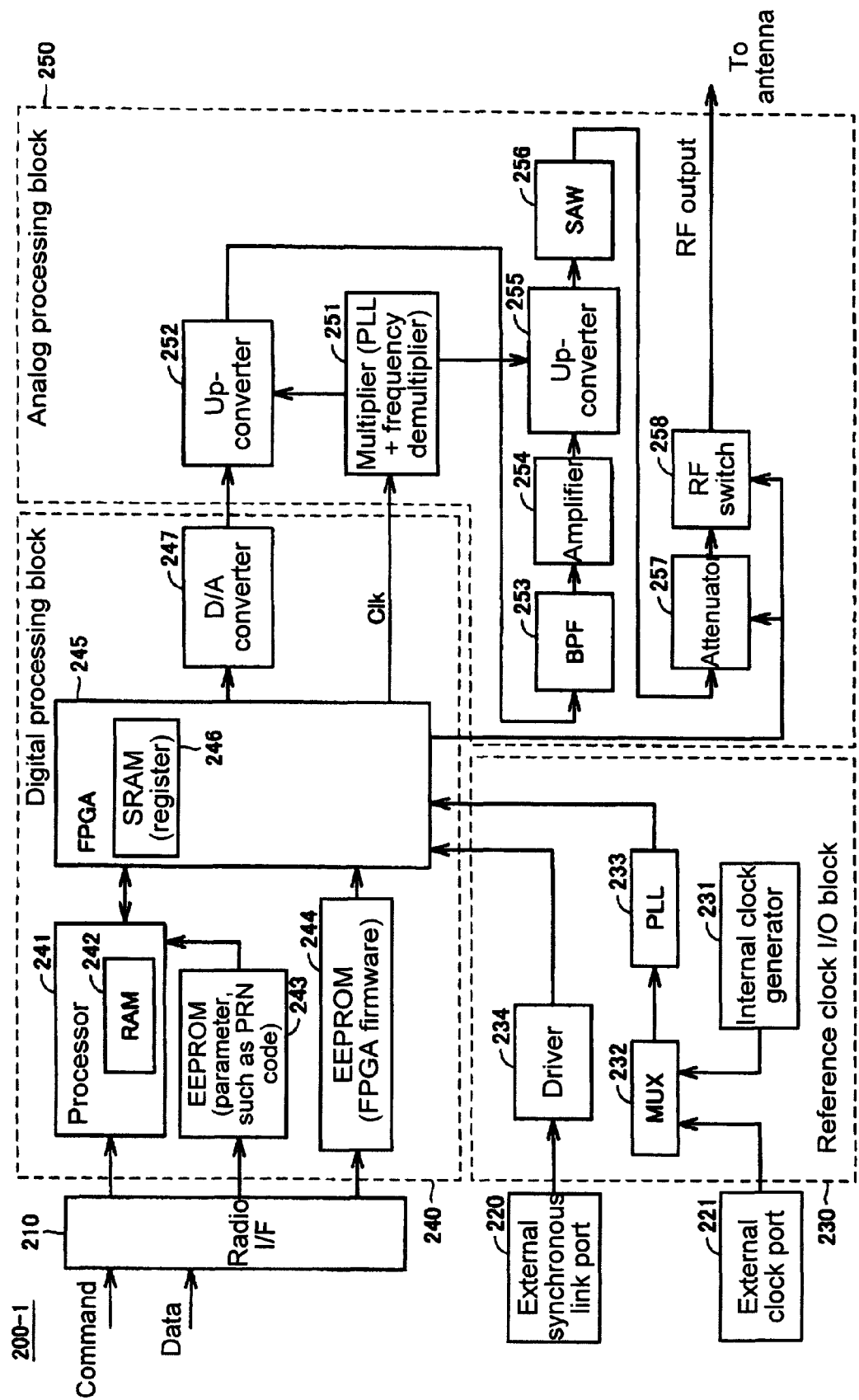
FIG. 2 is a block diagram a hardware configuration of an indoor transmitter 200-1.

With reference to FIG. 2, the indoor transmitter 200-1 will be described below. FIG. 2 is a block diagram showing a hardware configuration of the indoor transmitter 200-1.

The indoor transmitter 200-1 comprises a radio (wireless) interface (hereinafter referred to as "radio I/F") 210, a digital processing block 240, a reference clock input/output block (hereinafter referred to as "reference clock I/O block") 230 electrically connected to the digital processing block 240 and for supplying a reference clock for an operation of each circuit section, an analog processing block 250 electrically connected to the digital processing block 240, an antenna (not shown) electrically connected to the analog processing block 250 and for sending out a positioning signal, and a power supply (not shown) for supplying a power supply potential to each section of the indoor transmitter 200-1.

The power supply may be incorporated in the indoor transmitter 200-1, or the indoor transmitter 200-1 may be configured to receive a supply of electric power from the outside.

(Radio Communication Interface)

The radio I/F 210 is a radio (wireless) communication interface, and designed to receive an external command, and receive and, if necessary, transmit data about a setting parameter and a program (firmware, etc.) from/to the outside, by near-field communication, such as Bluetooth (trademark), or radio communications, such as PHS (Personal Handy-phone system) or a mobile phone network.

Based on the radio I/F 210, the indoor transmitter 200-1 is allowed to change a setting parameter, such as position data (data indicative of an installation location of the indoor transmitter 200-1) to be transmitted from the indoor transmitter 200-1, or change firmware so as to cope with a different communication scheme, even after it is installed on a ceiling or the like in an indoor area.

In the first embodiment, it is presupposed that an interface is a wireless type. Alternatively, in cases where a wired interface is advantageous even in consideration of time/labor for wiring/installation to an installation location, etc, the interface may be a wired type.

(Digital Processing Block)

The digital processing block 240 comprises: a processor 241 which is operable, according to a command from the radio I/F 210 or according to a program, to control an operation of the indoor transmitter 200-1; a RAM (Random Access Memory) 242 which stores therein a program to be executed by the processor 241 and is mounted on the processor 241; an EEPROM (Electronically Erasable Programmable Read-Only Memory) 243 for storing therein a setting parameter and others as a part of data from the radio I/F 210; a field programmable gate array (hereinafter referred to as "FPGA") 245 which is operable, under control of the processor 241, to generate a baseband signal to be sent out from the indoor transmitter 200-1; an EEPROM 244 for storing therein firmware of the FPGA 245, as a part of the data from the radio I/F 210; and a digital/analog converter (hereinafter referred to as "D/A converter") 247 which is operable to convert the baseband signal output from the FPGA 245, into an analog signal, and give the analog signal to the analog block 250.

More specifically, the digital processing block 240 is configured to generate data which is a source of a signal to be transmitted as a positioning signal from the indoor transmitter 200-1. Further, the digital processing block 240 is configured to send out the generated data to the analog processing block 250 in the form of a bit stream.

Although not particularly limited to the following, for example, upon application of power to the FPGA 245, the firmware program stored in the EEPROM 244 is loaded on the FPGA 245. Information (bit stream data) of the firmware program is loaded on a configuration memory composed of an SRAM (Static Random Access Memory) 246 within the FPGA 245. Individual bit data of the loaded bit stream data serves as information source for a circuit to be achieved on the FPGA 245, to allow a resource provided in the FPGA 245 to be customizes in such a manner to achieve a circuit specific to the firmware program. As above, the FPGA 245 has external configuration data without relying on hardware, so that high versatility and flexibility can be achieved.

Further, the processor 241 is operable, according to an external command received from the radio I/F 210 and based on data stored in the EEPROM 243, to store the following data in the SRAM 246 (register) of the FPGA 245, as a parameter to be set for the indoor transmitter 200-1.

1) Pseudo Random Noise Code (PRN code)
2) Transmitter ID
3) Position Identification Data
4) Broadcast Notification Data (Each of the data 3 and 4 is formed in a format compatible with the navigation message from the satellite, in terms of hardware of a receiver, as described later.)

The "position identification data" and the "broadcast notification data" will be described later.

5) Digital filter selection parameter

The FPGA 245 is operable, based on the PRN code stored in the EEPROM 243, to subject a signal having an aftermentioned format to a spectrum-spreading processing. A value itself of the PRN code may be stored in and read out from the EEPROM 243, or the PRN code may be generated in real time by a PRN generator comprising a register.

A program for the operation of the processor 241 is also pre-stored in the EEPROM 243. Upon activation of the indoor transmitter 200-1, this program is read out from the EEPROM 243 and transferred to the RAM 242.

A storage device for storing therein a program or data is not limited to the EEPROM 243 or the EEPROM 244. The storage device may be a type capable, at least, of holding data in a nonvolatile manner. Further, in cases where data is input from outside as described later, the storage device may be a type capable of allowing data to be written therein. A data structure of data to be stored in the EEPROM 243 will be described later.

(Analog Processing Block)

The analog processing block 250 is configured to modulate a 1.57542 GHz carrier wave using the bit stream data output from the digital processing block 240, to generate a transmitter signal, and send out the transmitter signal to the antenna. The signal is emitted from the antenna.

More specifically, a signal output from the D/A converter 247 of the digital processing block 240 is up-converted by an up-converter 252. Then, after only a part of the up-converted signal in a give frequency band is amplified through a band-pass filter (BPF) 253 and an amplifier 254, the amplified signal is up-converted by an up-converter 255 again. Then, after a part of the up-converted signal in a given frequency band is extracted by a SAW (Surface Acoustic Wave) filter, the extracted signal is converted into a signal having a predetermined intensity by a variable attenuator 257 and an RF switch 258, and the obtained signal is sent out from the antenna.

A clock for use in the up-converter 252 and the up-converter 255 is generated by multiplying the clock supplied from the reference clock I/O block 230 to the FPGA 245, through a multiplier 251.

Setting of respective levels of the variable attenuator 257 and the RF switch 258 is controlled by a control signal from the processor 241 via the FPGA 245. The RF switch 258 is operable to effectively change a signal intensity by means of so-called "PM (Pulse Modulation)".

Figure 5:
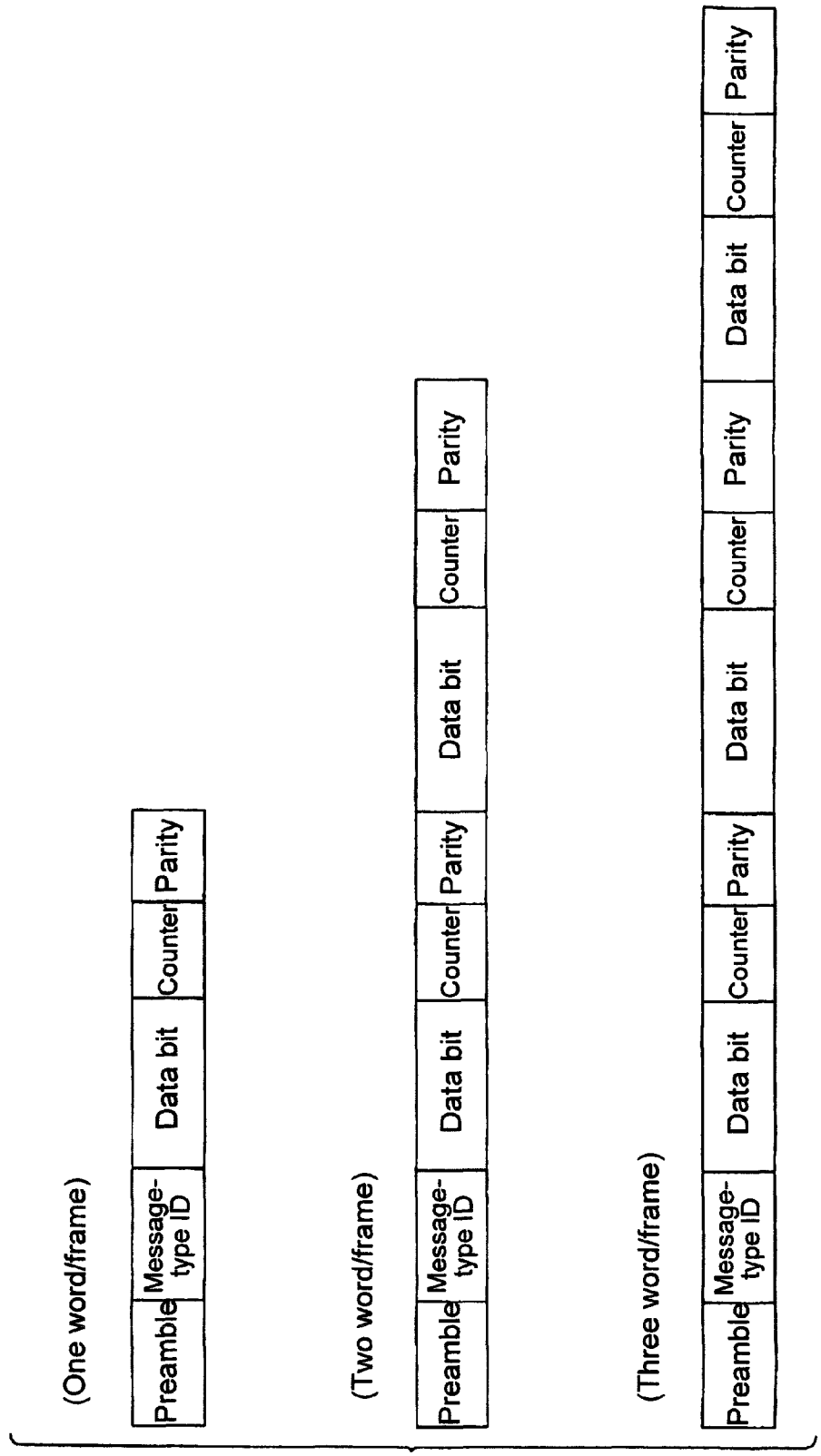
FIG. 5 is a diagram showing a frame structure of an IMES (Indoor MEssaging System) signal.

In the above manner, a signal having a structure compatible with the positioning signal from a satellite, in terms of a positioning signal-receiving front-end of a receiver, is emitted from the indoor transmitter 200-1. In this case, a content of the signal is not exactly identical to that included in the positioning signal emitted from the satellite. One example of the structure of the signal to be emitted from the indoor transmitter 200-1 will be described later (FIG. 5).

In the above description, the FPGA 245 is used as a processing unit for achieving a digital signal processing in the digital processing block 240. Alternatively, any other suitable type of processing unit may be used, as long as it is capable of changing a function of a radio (wireless) unit by means of software.

In FIG. 2, a clock signal (Clk) is supplied to the analog processing block 250 via the digital processing block 240. Alternatively, the clock signal may be directly supplied from the reference clock I/O block 230 to the analog processing block 250.

In the first embodiment, the digital processing block 240 and the analog processing block 250 are shown separately, for the sake of clarifying the illustration. However, in a physical aspect, they may be mixedly mounted on a single chip.

(Reference Clock I/O Block)

The reference clock I/O block 230 is configured to supply a clock signal for governing the operation of the digital processing block 240 or a clock signal for generating a carrier wave, to the digital processing block 240.

In an "external synchronization mode", a driver 234 of the reference clock I/O block 230 is operable to supply a clock signal to the digital processing block 240 and others, based on a synchronizing signal given from an external clock generator to an external synchronous link port 220.

Further, in an "external clock mode", a multiplexer 232 of the reference clock I/O block 230 is operable to select an external clock signal given to an external clock port 221 in such a manner that a clock signal is output from a PLL (Phase Locked Loop) circuit 233 and supplied to the digital processing block 240 and others, in synchronization with the external clock.

In an "internal clock mode", the multiplexer 232 of the reference clock I/O block 230 is operable to select an internal clock signal generated by an internal clock generator 231 in such a manner that a clock signal is output from the PLL (Phase Locked Loop) circuit 233 and supplied to the digital processing block 240 and others, in synchronization with the internal clock.

An internal state (e.g., a "PLL control" signal) of the indoor transmitter may be monitored from the radio I/F 210, based on a signal output from the processor 241. A digital input/output interface 260 may be configured to accept an input of a pseudo random noise code pattern for spread-modulating a signal to be emitted from the indoor transmitter 200-1, or the radio I/F 210 may be configured to accept an input of additional data to be emitted from the indoor transmitter 200-1. For example, the additional data may include text data (position data) indicative of an installation location of the indoor transmitter 200-1. In cases where the indoor transmitter 200-1 is installed in a commercial area, such as a department store, "advertisement information", "traffic information", "weather information" and/or "disaster information" may be input into the indoor transmitter 200-1, as the additional data.

When a pseudo random noise code (PRN code) pattern is input into the indoor transmitter 200-1, it is written in a predefined area in the EEPROM 243. According to need, a PRN-ID and a transmitter name may further be written in the EEPROM 243, and then the written-in PRN-ID and transmitter name may be included in a positioning signal. The additional data is also written in an area reserved in the EEPROM 243 depending on a type of data.

[Data Structure of Data to be Stored in EEPROM 243]

Figure 3:
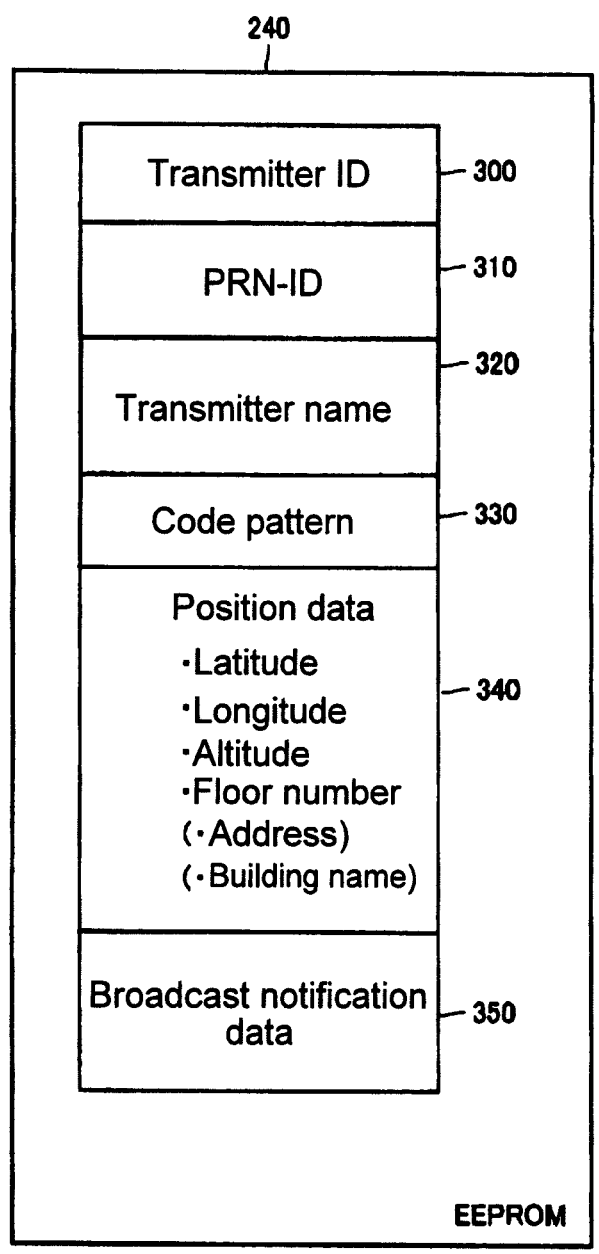
FIG. 3 is a diagram conceptually showing one mode of data storage in an EEPROM 243 provided in the indoor transmitter 200-1.

With reference to FIG. 3, a data structure of data to be stored in the EEPROM 243 will be described below.

FIG. 3 is a diagram conceptually showing one mode of data storage in the EEPROM 243 provided in the indoor transmitter 200-1. The EEPROM 243 includes a plurality of areas 300 to 350 for storing data therein.

In the area 300, a transmitter ID is stored as a number for identifying a transmitter. For example, the transmitter ID may be a numerical character and/or an alphabetical character, or a combination thereof, which is written in a memory in a nonvolatile manner during production of the transmitter.

A PRN-ID of a pseudo random noise code assigned to the transmitter is stored in the area 310. A transmitter name is stored in the area 320 in the form of text data.

A pseudo random noise code pattern assigned to the transmitter is stored in the area 330. This pseudo random noise code pattern is one selected from a plural finite number of code patterns which are pre-assigned to the position information providing system according to the first embodiment, from a large number of code patterns belonging in the same category as that of the pseudo random noise code patterns for the satellites. Thus, the pseudo random noise code pattern assigned to the transmitter is different from that assigned to each of the satellites.

The number of pseudo random noise code patterns to be assigned to the position information providing system is finite, whereas the number of indoor transmitters varies depending on a size of an indoor-transmitter installation location, or a structure of the installation location (the number of floors of a building, etc.), so that the number of indoor transmitters is likely to become greater than that of the code patterns. Thus, there is a possibility that a plurality of indoor transmitters have the same pseudo random noise code pattern. In this case, an installation location of each of the indoor transmitters having the same code pattern may be set while taking into account a signal output. This makes it possible to prevent a plurality of positioning signals using the same pseudo random noise code pattern from being received by a same one of the position information providing apparatuses, at the same timing.

Position data for identifying an installation location of the indoor transmitter 200-1 is stored in the area 340. For example, the position data is expressed as a combination of a longitude, a latitude and an altitude. In addition to or in place of the position data, a mail address/building name may be stored in the area 340. In the present invention, data capable of identifying an installation location of the indoor transmitter 200-1 only by itself, such as a "combination of a latitude, a longitude and an altitude", a "combination of a latitude, a longitude and a floor number of a building", a "combination of a latitude, a longitude, a floor number of a building and an altitude", a "mail address/building name", "the combination of a latitude, a longitude and an altitude, and the mail address/building name", will be referred to collectively as "position identification data". Further, data indicative of information other than the position identification data, such as the aforementioned "advertisement information", "traffic information", "weather information" and/or "disaster information", to be broadcasted by the indoor transmitter, will be referred to as "broadcast notification data".

The position identification data is stored in the area 340, and the broadcast notification data is stored in the area 350.

Each of the PRN-ID, the communication transmitter name, the pseudo noise code pattern, the position identification data and the broadcast notification data can be changed to other data input through the radio I/F, as mentioned above. In particular, the broadcast notification data is changed or updated as needed. For example, in cases where the indoor transmitter 200-1 is installed in a department store, advertisement data may be given to the indoor transmitter 200-1 by an operations manager, as one business operation of the department store.

[Data Structure of Signal to be Transmitted from Indoor Transmitter 200-1]

Firstly, a structure of a signal compatible with a positioning signal emitted from the satellite together with a navigation message superimposed thereon, for example, an L1-band C/A code, will be described.

(L1C/A-Compatible Signal)

Figure 4:
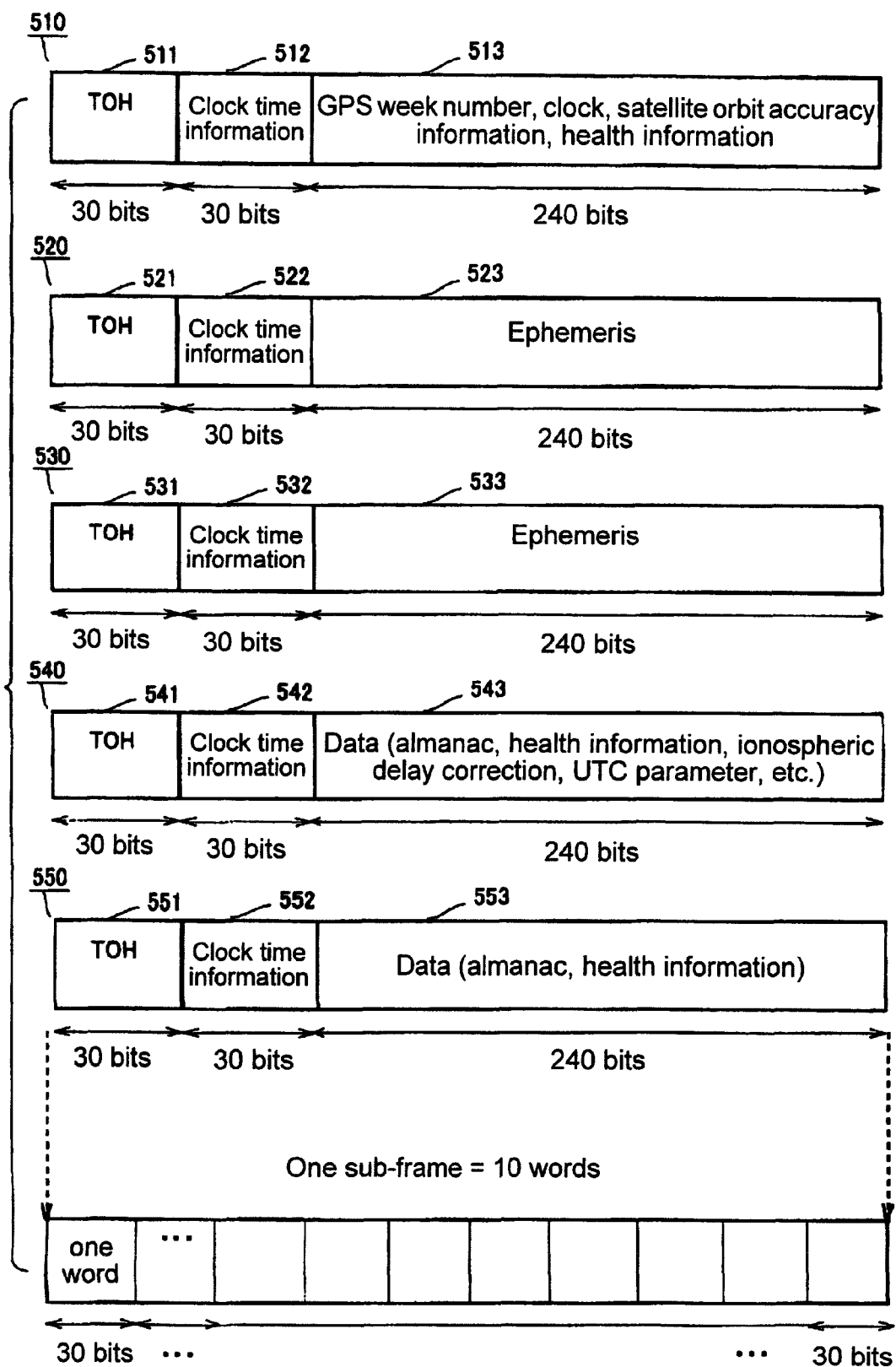
FIG. 4 is a diagram showing a structure of an L1-band C/A code signal to be emitted by a transmitter mounted on a GPS satellite.

With reference to FIG. 4, a positioning signal to be transmitted from the transmitter of the satellite will be described.

FIG. 4 is a diagram showing a structure of a L1-band C/A code signal 500 to be emitted from the transmitter mounted on the GPS satellite. The signal 500 is comprised of five sub-frames each consisting of 300 bits, i.e., sub-frames 510 to 550. The sub-frames 510 to 550 are repeatedly transmitted by the transmitter. In this example, each of the sub-frames 510 to 550 consists of 300 bits, and is transmitted at a bit rate of 50 bps (bit per second). Thus, each of the sub-frames is transmitted in 6 seconds. A content of each of the 4th and 5th sub-frames 540, 550 is sequentially replaced with another content, and returned to the initial content in the 25th cycle. Each of the contents to be replaced is called "page", and each of the 4th and 5th sub-frames consists of 25 pages.

The 1st sub-frame 510 comprises a 30-bit transport overhead 511, a 30-bit clock time information 513, and 240-bit message data 513. More specifically, the clock time information 512 includes clock time information acquired when the 1st sub-frame 510 is generated, and a sub-frame ID. The sub-frame ID is an identification number for distinguishing the 1st sub-frame from the remaining sub-frames. The message data 513 includes a GPS week number, clock information, health information about the GPS satellite, orbit accuracy information about the GPS satellite.

The 2nd sub-frame 520 comprises a 30-bit transport overhead 521, a 30-bit clock time information 522, and 240-bit message data 523. The clock time information 522 has the same structure as that of the clock information 512 in the 1st sub-frame 510. The message data 523 includes an ephemeris. The ephemeris (broadcast ephemeris) means orbit information about a satellite emitting a positioning signal. The ephemeris is highly-accurate information which is successively updated by an administrative bureau managing navigation of the satellite.

The 3rd sub-frame 530 has the same structure as that of the 2nd sub-frame 520. Specifically, the 3rd sub-frame 530 comprises a 30-bit transport overhead 531, a 30-bit clock time information 532, and 240-bit message data 533. The clock time information 532 has the same structure as that of the clock information 512 in the 1st sub-frame 510. The message data 533 includes the ephemeris.

The 4th sub-frame 540 comprises a 30-bit transport overhead 541, a 30-bit clock time information 542, and 240-bit message data 543. Differently from the above message data 513, 523, 533, the message data 543 includes almanac information, summary of satellite health information, ionospheric delay information, and an UTC (Coordinated Universal Time) parameter.

The 5th sub-frame 550 comprises a 30-bit transport overhead 551, a 30-bit clock time information 552, and 240-bit message data 553. The message data 553 includes almanac information, and summary of satellite health information. Each of the message data 543, 553 is composed of 25 pages, wherein the above different types of information are defined in each page. The almanac information is indicative of respective coarse orbits of the GPS satellite and all the remaining GPS satellites. After the transmission of the sub-frames 510 to 550 is repeated 25 times, the message data is returned to the 1st page, and the same information will be emitted.

The sub-frames 510 to 550 are transmitted from each of the transmitters 120, 121, 122. When the sub-frames 510 to 550 are received by the position information providing apparatus 100, a position of the position information providing apparatus 100 is calculated based on maintenance/management information included in each of the transport overheads 511 to 551, clock time information 512 to 552 and the message data 513 to 553.

In the above example, each of the sub-frames 510 to 550 consists of 10 words. Each of the words consists of 30 bits. Each of the words comprises required data, and an error-detecting parity bit, wherein a leading one of the words in each of the sub-frames includes a preamble. Synchronization information and telemeter information are included in two of the words at the beginning of the sub-frame. A HOW (Hand Over Word) and a z-count are incorporated in these information. The z-count is data equivalent to a clock time code (o'clock, minute, second), and the HOW is data for shifting to a P code.

(Structure of IMES Signal)

A signal to be transmitted from the indoor transmitter 200-1 (IMES (Indoor MEssaging System) signal) will be described below.

The position information providing system according to the present invention is designed to install an indoor transmitter in a location, such as an indoor area, where it is difficult for a positioning signal from a GPS or QZSS satellite to penetrate, so that a user is allowed to seamlessly acquire position information in indoor and outdoor areas, using the same receiving terminal as that for the GPS or QZSS.

The system can achieve position determination in indoor and outdoor areas by modifying only software, while diverting a GPS receiver chip (positioning signal-receiving front-end) which has already been mounted on an existing mobile phone, without modification.

A navigation message superimposed on a GPS positioning signal is repeatedly transmitted at an extremely low transmission rate of 50 bps, and in the following fixed format: 300 bits/sub-frame, and 5 sub-frames×25 pages, as mentioned above.

Although standardization in hardware of a receiver to facilitate standardization between an IMES Signal and a GPS signal has the above advantage, there is a problem that it takes too much time until a user acquires position information after read of a message, if the fixed format of the GPS signal is used without modification. Moreover, if a signal compatible with the positioning signal with the fixed format from the satellite is used, a transmittable volume of a message will be restricted. Thus, in cases where this system is used as an advertising medium, restrictions will be imposed on an amount of information.

Further, differently from the GPS satellite, the indoor transmitter 200-1 in the present invention is designed to transmit position information of the indoor transmitter itself to a user, so that it will just repeatedly broadcast the same bit sequence, as described later. In this case, if a frame synchronization technique using a preamble and a parity bit is simply employed, and a bit sequence having the same positional relationship between the preamble and the parity bit as that contingently appears at a wrong position in a frame, it is likely that an error in frame synchronization occurs, and correct position information is not demodulated in a user's terminal.

Notification of position information during emergency messaging is required to have a high degree of accuracy. In a CDMA (Code Division Multiple Access) system, under a condition that a sufficient signal-to-noise ratio is not obtained for a desired signal, i.e., due to a so-called "near-far problem", signal capture/tracking is likely to perform using an erroneous PRN code. Specifically, while a signal (IMES signal) from the indoor transmitter and a positioning signal from a satellite are distinguished from each other based on their PRN codes, there is a possibility that the satellite positioning signal is erroneously captured based on the PRN code for the IMES signal, or the signal from the indoor transmitter is erroneously captured based on the PRN code for the satellite signal. In this case, it is necessary to quickly detect the erroneous capture and perform re-capture based on a correct PRN code. Due to this processing, a time required for acquiring position information is likely to significantly increase.

In the present invention, with a view to achieving a reduction in message acquisition time, ensuring of flexibility depending on user's intended use, and ensuring of high reliability required for notification of position information during emergency messaging, while maintaining standardization between an IMES signal and a GPS signal to a maximum extent, the following signal structure is used for the IMES signal.

i) Standardization with Positioning Signal from Positioning Satellite (e.g., GPS C/A Signal)

In view of standardization in hardware of a receiver and software for a signal processing, it is desirable to standardize signal specifications and message specifications. A high-frequency characteristic (RF characteristic) of the IMES signal, and a PRN code sequence for the IMES signal, are standardized with those of a positioning signal from a positioning satellite (e.g., GPS C/A signal). As for a message structure, one word consists of 30 bits, and an 8-bit preamble and a 6-bit parity bit for code-error detection are provided at a head of a frame and at a tail end of each word, respectively. As for a parity-code calculation algorithm, the same algorithm as that of the GPS C/A signal is used.

Thus, more generally, the term "word" means a transmission unit of data to be subjected to error detection. The term "frame" means a transmission unit of data which includes a preamble signal for synchronization, at the beginning thereof. The frame is composed of a plurality of words, e.g., 10 words. The "error detection" to be performed on a word-by-word basis may be "error detection and correction" or may be "error correction".

ii) Shortening of TTRM (Time To Read Message)

A fixed format of a navigation message of a positioning signal from a positioning satellite (e.g., GPS C/A signal) is modified to obtain a variable frame-length and shorter message format to be employed.

iii) Versatility/Flexibility Depending on Intended Use

The fixed format of the navigation message of the positioning signal from the positioning satellite (e.g., GPS C/A signal) is modified such that a leading word in a frame has a message-type ID with a given bit length, e.g., a 3-bit length, to allow a transmitter installation personnel to set a content and a transmission order/frequency of a message to be transmitted, depending on the intended use/purpose. In the following message specifications to be described by way of illustration, among a plurality of message-type IDs settable by 3 bits, four IDs are defined, and the remaining IDs are reserved to be utilized for a new use in future.

iv) Ensuring of High Reliability of Indoor Position Information (Prevention of Erroneous Synchronization)

A counter bit having a given bit length, e.g., a 3-bit length, is provided in each word, and a count value is incremented every time each word is transmitted. When the count value is counted up to 111, the count-up operation will be restarted from 000. The count-up operation makes it possible to eliminate a situation where a given relationship between a preamble and a parity at a rail end of a word becomes contingently satisfied at a position other than a proper position and will repeatedly appear, and reliably detect a head of a frame to establish frame synchronization so as to prevent erroneous position information from being output.

v) Ensuring of High Reliability of Indoor Position Information (Prevention of Erroneous Capture)

In a modernized GPS signal (L2C signal and subsequent signals), a message is transmitted together with a PRN-ID included therein, so that a receiver can immediately recognize erroneous capture, based on a fact that a captured PRN code is not identical to the PRN-ID in the message. However, the PRN-ID is not included in the C/A signal. Therefore, in the present invention, in order to quickly recognize erroneous capture, a preamble of a message for the indoor transmitter is set to a value (bit pattern) different from that of a preamble of a GPS or QZSS signal.

(Signal Specifications of IMES Signal)

A structure of the signal to be transmitted from the indoor transmitter 200-1 (IMES signal) will be more specifically described below.

The IMES signal has an RF characteristic corresponding to that of a positioning signal from a satellite (e.g., an L1-band C/A code of the GPS or QZSS). While the IMES signal is the same as the satellite positioning signal in that a structure of a navigation message has a 30-bit word as a basic unit, it has a delimited short frame structure to provide a shorter TTRM.

In view of the RF characteristic and a message characteristic, the signal specifications will be described below.

(1) RF Characteristic (1-1) Signal Structure

For example, a nominal center frequency is 1575.42 MHz, and a PRN-spreading frequency is 1.023 MHz. For example, a PRN-spreading modulation scheme is a BPSK (Binary Phase Shift Keying) modulation.

(1-2) Number of Channels and PRN Code

The IMES signal has a single carrier wave, and is the same code sequence as that of a PRN code of the satellite positioning signal (e.g., C/A signal).

(1-3) Navigation Message

A navigation message of the IMES signal has the same word structure, bit rate and modulation scheme as those of a navigation message of the satellite positioning signal (e.g., C/A signal).

(2) Message Characteristic (2-1) Word Structure

One word consists of the same word length as that of the satellite positioning signal, e.g., 30 bits. For example, in cases where one word consists of 30 bits, one word includes 21-bit data, a 3-bit word counter, and a 6-bit parity.

(2-2) Word Counter

Each word has a word counter. The FPGA 245 of the indoor transmitter 200-1 is operable, every time each word is transmitted, to increment a value of the word counter by a given value, e.g., by one.

The word counter assists an identification of word and frame delimiters. In order to assist the identification of the delimiters, the 3-bit word counter is configured such that it does not take the same value as that of the higher-order 3 bits of the preamble, i.e., it skips the value.

(2-3) Parity Code

An error detection code (e.g., parity code) having a given bit length, e.g., a 6-bit length is provided at a tail end of the 30-bit word. The error detection code is the same code as that of the satellite positioning signal, e.g., a (32, 26) extended hamming code. The parity code assists the identification of the word delimiter.

(2-4) Parity Algorithm and Parity Check Algorithm

The same error detection code generation algorithm and error detection algorithm as those for the satellite positioning signal are used.

(2-5) Frame Structure

FIG. 5 is a diagram showing a frame structure of the IMES signal.

One frame consists of an integral multiplication of the word, and has the following format. The frame having the illustrated structure is transmitted sequentially and repeatedly.

In the 1st word, there is a preamble having a given bit length, e.g., an 8-bit length, and the preamble is followed by a message-type ID (MID) having a given bit length, e.g., a 3-bit length. Except the 3-bit word counter in each word and the 6-bit parity in each word, all the remaining bits are data bits.

FIG. 5 illustrates a case where one frame consists of one word, another case where one frame consists of two words, and yet another case where one frame consists of three words.

Although the IMES signal to be transmitted from each of the indoor transmitters 200-1 to 200-6 is standardized with the satellite positioning signal in terms of a word structure, it is different from the satellite positioning signal in terms of the number of words making up one frame. Specifically, one frame of the IMES signal consists of a plurality of words wherein the number of the words is less than that of words included in one frame of the satellite positioning signal.

(2-6) Preamble

The 8-bit preamble provided in a leading end of the 1st word in each frame has a given bit pattern.

This preamble assists the identification of the frame delimiter. Differently from a bit pattern of a preamble of the satellite positioning signal, the bit pattern of the preamble of the IMES signal is configured to allow the IMES signal to be distinguished from the satellite positioning signal of the GPS or QZSS.

(2-7) Message-Type ID (MID)

The 3-bit message-type ID (MID) provided after the preamble of the 1st word in each frame indicates a frame length and a content of a frame including the 1st word.

FIG. 6 shows a comparison between a value of the MID and a frame length/content. A content of FIG. 6 will be more specifically described below.

(2-7-1) Content of Massage (2-7-1-1) Massage-Type ID "000": Position Information 1

When the massage-type ID is "000", the frame length is 3 words, and the frame content is position information.

Figure 7:
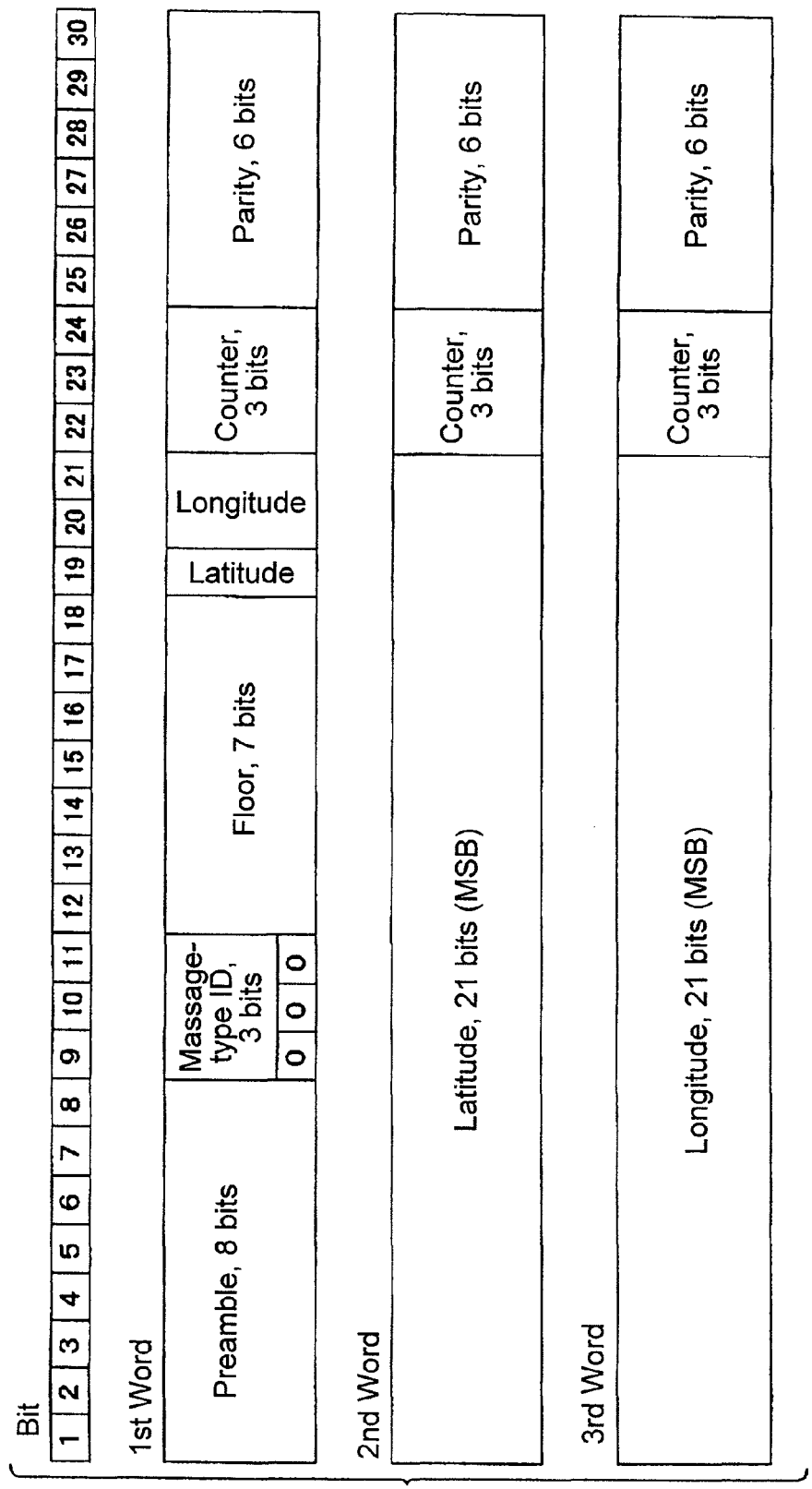
FIG. 7 is a diagram showing a frame structure when the massage-type ID is "000".

FIG. 7 is a diagram showing a frame structure when the massage-type ID is "000".

FIG. 8 is a table showing respective examples of data contents in the frame, corresponding values of a bit length and an LSB (Least Significant Bit), and a range to be expressed. With reference to FIGS. 7 and 8, contents thereof will be described below.

i) Floor Number

The 12th to 18th bits of the 1st word represent a floor number of a building where the indoor transmitter is installed, and a unit thereof is "n-th".

This value has a bit length of 7 bits, and no code. The LSB indicates the 1st floor. An offset of −26th floor is set, and a range of −26th floor to +100th floor is expressed.

ii) Latitude

The 1st to 21st bits of the 2nd word are arranged on the side of an MSB (Most Significant Bit). Total 22 bits obtained by adding the 19th bit of the 1st word to the 21 bits represent a latitude of the indoor transmitter, and a unit thereof is "degree".

This value has a code. The LSB is in the range of $180/10^{22}$ [degree] to 0.000043 [degree], which represents −90 degrees to +90 degrees. It is equivalent to about 4.8 m in a north-south direction.

iii) Longitude

The 1st to 21st bits of the 3rd word are arranged on the side of an MSB. Total 23 bits obtained by adding the 20th and 21st bits of the 1st word to the 21 bits represent a longitude of the indoor transmitter, and a unit thereof is "degree".

This value has a code. The LSB is in the range of $360/10^{23}$ [degree] to 0.000043 [degree], which represents −180 degrees to +180 degrees. It is equivalent to about 4.8 m in an east-west direction on the equator.

(2-7-1-2) Massage-Type ID "001": Position Information 2

When the massage-type ID is "001", the frame length is 4 words, and the frame content is position information.

Figure 9:
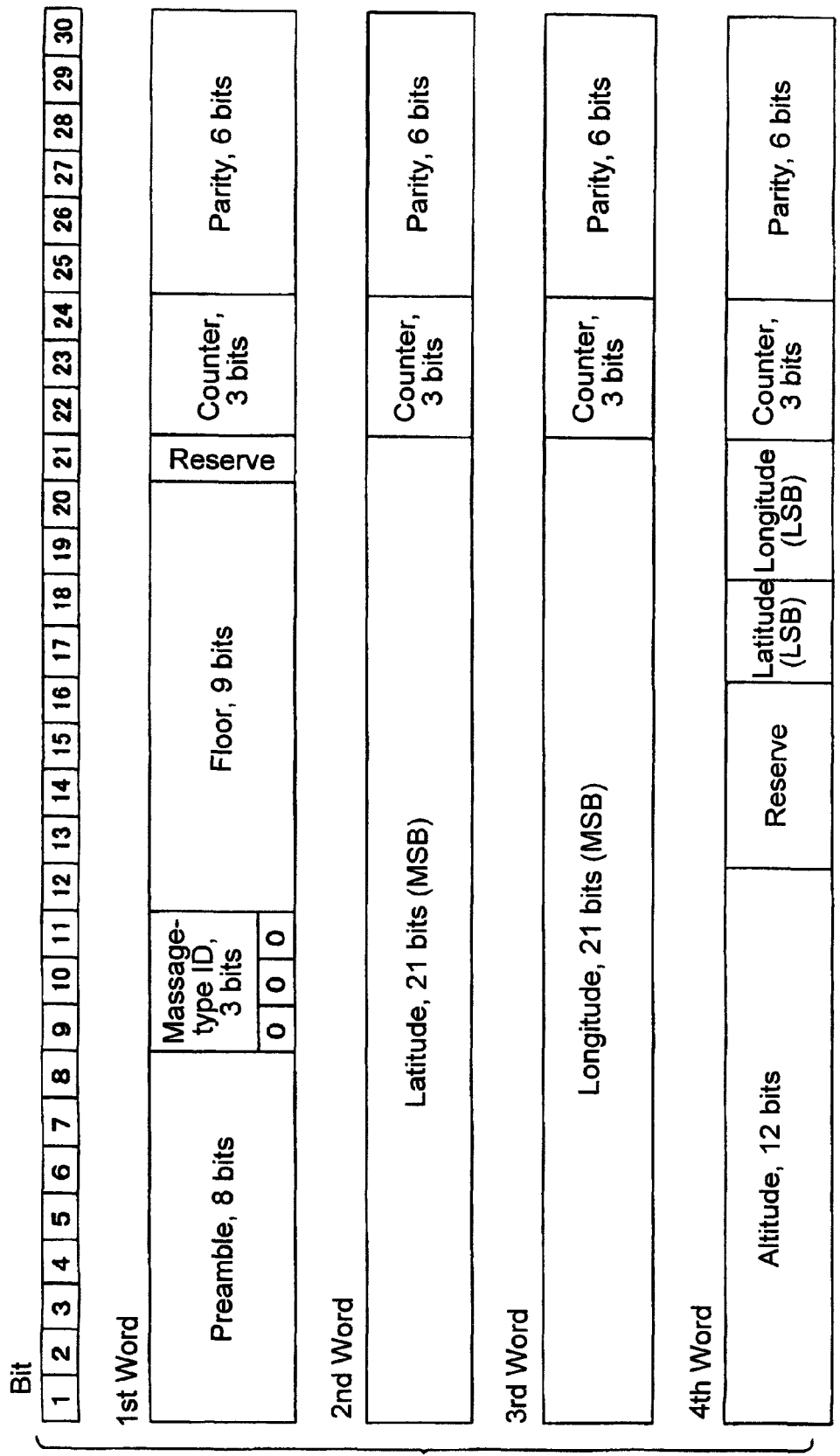
FIG. 9 is a diagram showing a frame structure when the massage-type ID is "001".

FIG. 9 is a diagram showing a frame structure when the massage-type ID is "001".

FIG. 10 is a table showing respective examples of data contents in the frame, corresponding values of a bit length and an LSB, and a range to be expressed. With reference to FIGS. 9 and 10, contents thereof will be described below.

i) Floor Number

The 12th to 20th bits of the 1st word represent a floor number of a building where the indoor transmitter is installed, and a unit thereof is "n-th".

This value has a bit length of 9 bits, and no code. The LSB indicates the 1st floor. An offset of −26th floor is set, and a range of −26th floor to +100th floor is expressed.

ii) Latitude

The 1st to 21st bits of the 2nd word are arranged on the side of an MSB. Total 23 bits obtained by adding the 17th and 18th bits of the 4th word to the 21 bits represent a latitude of the indoor transmitter, and a unit thereof is "degree".

This value has a code. The LSB is in the range of $180/10^{23}$ [degree] to 0.000021 [degree], which represents −90 degrees to +90 degrees. It is equivalent to about 2.4 m in a north-south direction.

iii) Longitude

The 1st to 21st bits of the 3rd word are arranged on the side of an MSB. Total 24 bits obtained by adding the 19th to 21st bits of the 4th word to the 21 bits represent a longitude of the indoor transmitter, and a unit thereof is "degree".

This value has a code. The LSB is in the range of $360/10^{24}$ [degree] to 0.000021 [degree], which represents −180 degrees to +180 degrees. It is equivalent to about 2.4 m in an east-west direction on the equator.

iv) Altitude

The 1st to 12th bits of the 4th word represent an altitude of the indoor transmitter, and a unit thereof is "m (meter)".

This value has no code. The LSB indicates 1 m. An offset of −95 m is set, and a range of −95 m to +4000 m is expressed.

(2-7-1-3) Massage-Type ID "011": Short ID

When the massage-type ID is "011", the frame length is 1 word, and the frame content is a short ID ($ID_S$).

Figure 11:
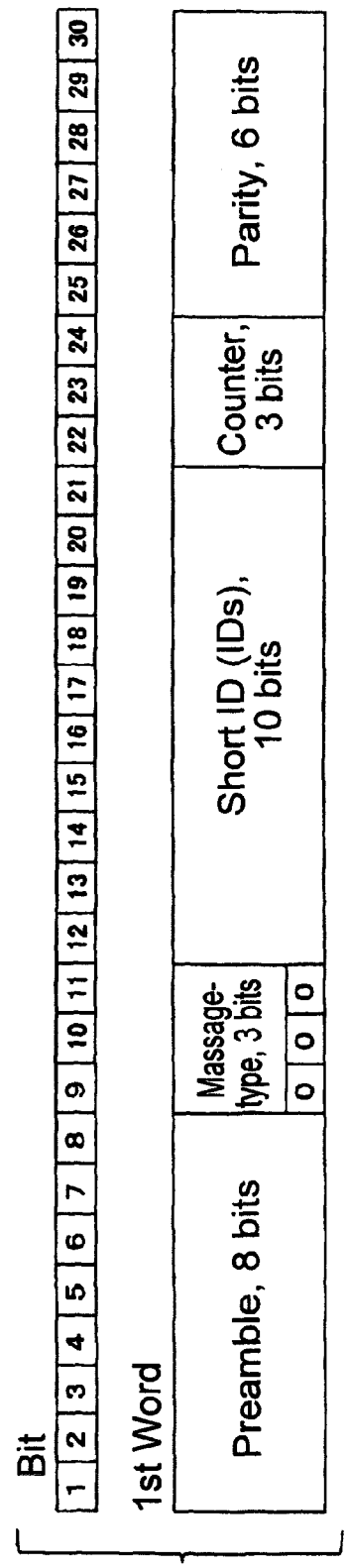
FIG. 11 is a diagram showing a frame structure when the massage-type ID is "011".

FIG. 11 is a diagram showing a frame structure when the massage-type ID is "011".

In a frame corresponding to the short ID, a 10-bit short ID message is transmitted.

Differently from the message-type ID "000" (type 0) and the message-type ID "001" (type 1), position information cannot be directly acquired from a content of the short ID message. A service provider can uniquely define an ID of the short ID message to develop a flexible position information service in an area narrower than that for the types 0 and 1.

The short ID message is used for association with position-related information to be provided, in a local server 204 managed by a service provider in units of commercial facility, such as a department store, a station mall or an underground shopping area, and used as a route guidance or a key of information delivery in the local server.

(2-7-1-4) Massage-Type ID "100": Medium ID

When the massage-type ID is "100", the frame length is 2 words, and the frame content is a medium ID ($ID_M$).

Figure 12:
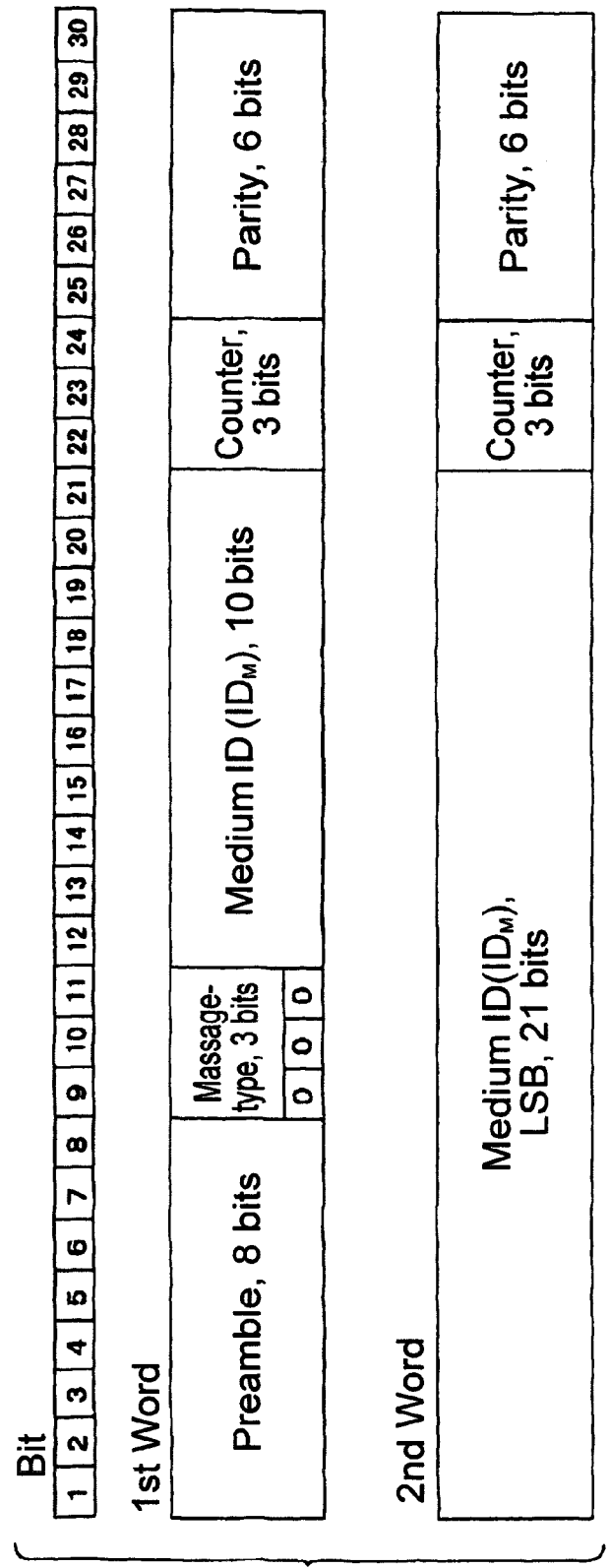
FIG. 12 is a diagram showing a frame structure when the massage-type ID is "100".

FIG. 12 is a diagram showing a frame structure when the massage-type ID is "100".

In a frame corresponding to the medium ID, a 10-bit medium ID message and a 21-bit medium ID message are transmitted.

The medium ID message is assigned in units of commercial facility, such as a department store, a station mall or an underground shopping area, and used to access a local server managed by a service provider in units of the commercial facility.

Specifically, for example, a server corresponding to a domain name server in the Internet manages the medium ID and an URL (Uniform Resource Locator) of the local server, as a database, wherein a user can access the local server using the medium ID.

Thus, the position information providing apparatus (e.g., a mobile phone) 100-5 is operable, in response to receiving the short ID message and the medium ID message, to send an inquiry about position-related information corresponding to the messages, to the local server 204 via a base station 202 and a network, so as to acquire the position-related information.

As used herein, the term "position-related information" may be at least one itself of the aforementioned information identifying a position of the indoor transmitter (e.g., floor number, latitude, longitude and/or altitude), "advertisement information", "traffic information", "weather information" and "disaster information".

[Configuration of Position Information Providing Apparatus 100 (Receiver)]

Figure 13:
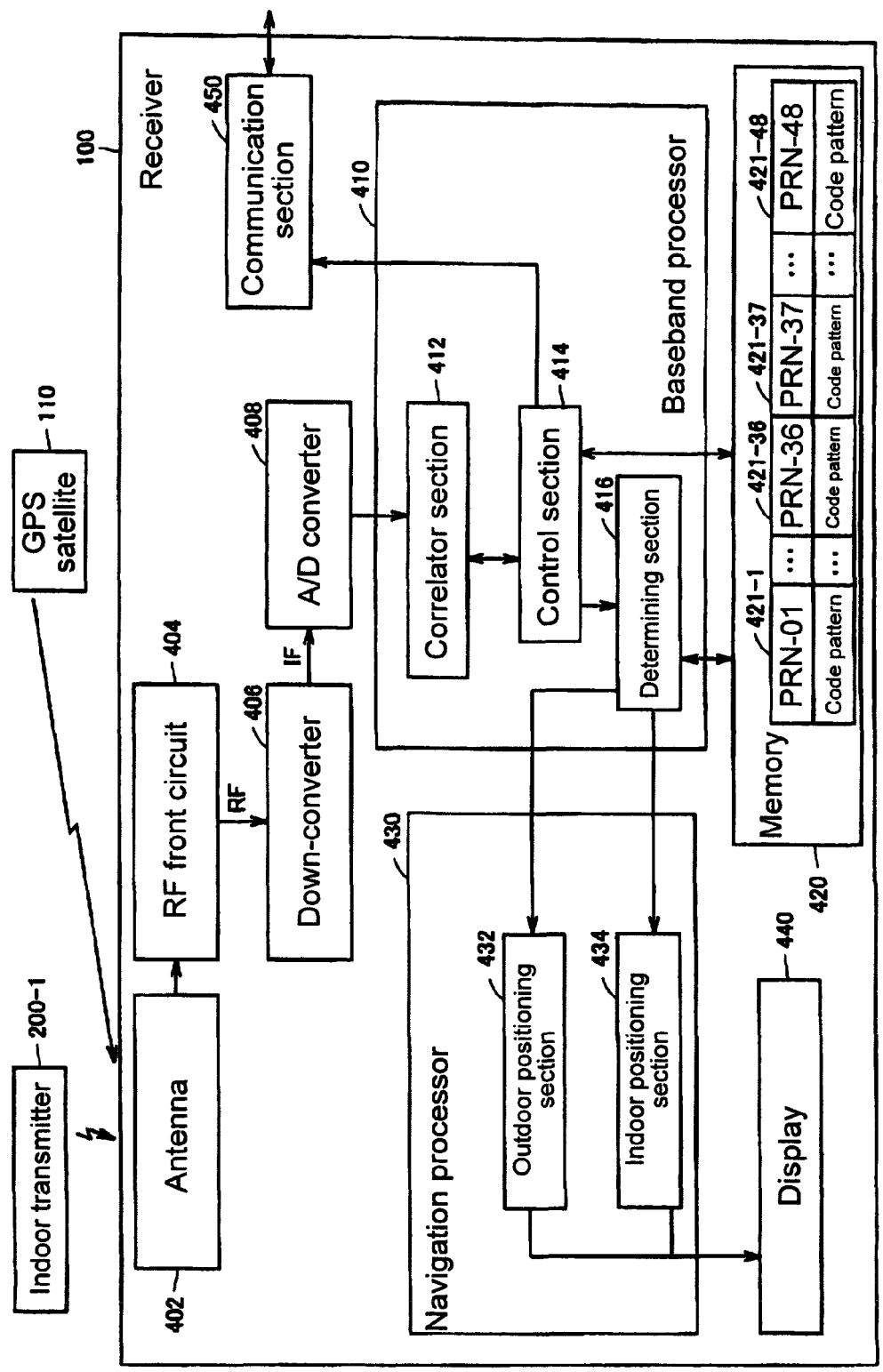
FIG. 13 is a block diagram a hardware configuration of a position information providing apparatus 100.

With reference to FIG. 13, the position information providing apparatus 100 will be described. FIG. 11 is a block diagram showing a hardware configuration of the position information providing apparatus 100.

The position information providing apparatus 100 comprises: an antenna 402; an RF (Radio Frequency) front circuit 404 electrically connected to the antenna 402; a down-converter 406 electrically connected to the RF front circuit 404; an A/D (Analog to Digital) converter 408 electrically connected to the down-converter 406; a baseband processor 410 electrically connected to the A/D converter 408; a memory 420 electrically connected to the baseband processor 410; a navigation processor 430 electrically connected to the baseband processor 410; and a display unit 440 electrically connected to the navigation processor 430.

The memory 420 includes a plurality of areas storing therein a plurality of pseudo random noise code patterns as data for identifying each emission source of positioning signals. For example, in cases where 48 types of code patters are used in the system, the memory 420 may include forty-eight areas 421-1 to 421-48. In another situation, if the number of the types of code patters is further increased, a larger number of areas will be assured in the memory 420. Conversely, the number of the types of code patterns may be set to a value less than the number of areas assured in the memory 420, on a case-by-case basis.

For example, in cases where 48 types of code patterns are used in a satellite-base position-determination system using 24 satellites, 24 identification data (PRN codes) for identifying the respective satellites, and 12 extra data are stored in the area 421-1 to 421-36. In this case, for example, a pseudo random noise code pattern for a first one of the satellites may be stored in the area 421-1. The code pattern can be read out from the area 421-1 and subject to a cross-correlation processing with respect to a received signal, so as to perform signal tracking and decoding of a navigation message included in the received signal. The memory 420 also stores therein a preamble pattern of the positioning signal from each of the satellites and a preamble pattern of the IMES signal from each of the indoor transmitters 200. Although a technique of reading out pre-stored code patterns has been shown as an example, a technique of generating code patterns using a code-pattern generator may also be employed. For example, the code-pattern generator may be achieved by combining two feedback shift registers. A configuration and an operation of the code-pattern generator would be easily understood by those skilled in the art. Thus, their detailed description will be omitted.

In the same manner, a plurality of pseudo random noise code patterns assigned to the 1st to n-th indoor transmitters each capable of emitting a positioning signal are stored in the areas 421-37 to 421-48. For example, a pseudo random noise code pattern assigned to the 1st indoor transmitter may be stored in the area 421-37. In this case, while the indoor transmitters having 12 types of code patterns can be used in the first embodiment, it is preferable to arrange the indoor transmitters in such a manner that two or more of the indoor transmitters using the same code pattern are not located within a receivable range of a same one of the position information providing apparatuses. This makes it possible to install 12 or more indoor transmitters, for example, in the same floor of the building 130.

The baseband processor 410 comprises a correlator section 412 adapted to accept a signal output from the A/D converter 408, a control section 412 for controlling an operation of the correlator section 412, and a determining section 416 for determining an emission source of a positioning signal based on data output from the control section 414. The navigation processor 430 comprises an outdoor positioning section 432 for determining an outdoor position of the position information providing apparatus 100, based on a signal output from the determining section 416, and an indoor positioning section 434 for deriving information indicative of an indoor position of the position information providing apparatus 100, based on data output from the determining section 416.

The antenna 402 is capable of receiving respective positioning signals emitted from the GPS satellites 110, 111, 112, and a positioning signal emitted from the indoor transmitter 200-1. Further, in cases where the position information providing apparatus 100 is embodied as a mobile phone, the antenna 402 is also capable of transmitting and receiving a signal for wireless telecommunication or data communication, in addition to the receiving of the above positioning signals.

The RF front circuit 404 is operable, in response to accepting a signal received by the antenna 402, to perform a noise removal processing, or a filtering processing for outputting only a signal having a predefined bandwidth. A signal output from the RF front circuit 404 is input into the down-converter 406.

The down-converter 406 is operable to amplify the signal output from the RF front circuit 404, and output the amplified signal as an intermediate-frequency signal. The intermediate-frequency signal is input into the A/D converter 408. The A/D converter 408 is operable to subject the intermediate-frequency signal input thereinto to a digital conversion processing to convert it into digital data. The digital data is input into the baseband processor 410.

In the baseband processor 410, the correlator section 412 is operable to perform a correlation processing between the received signal and the code pattern read out from the memory 420 by the control section 414. For example, the control section 414 is operable to provide two types (or two or more types) of code patterns different in code phase by 1 bit, and the correlator section 412 is operable to perform a processing of matching the code patterns with the digital data send out from the A/D converter 408. Further, the correlator section 412 is operable, based on the code patterns, to track a positioning signal received by the position information providing apparatus 100 and identify one of the code patterns which has a bit sequence identical to that of the positioning signal. In this manner, the pseudo random noise code pattern is identified. Thus, the position information providing apparatus 100 can determine from which of the satellites the received positioning signal is transmitted, or whether the received positioning signal is transmitted from the indoor transmitter. Then, the position information providing apparatus 100 is operable, based on the identified code pattern, to demodulate the positioning signal and decode a message therein.

More specifically, the determining section 416 is operable to perform the above determination and send out data depending on the determination, to the navigation processor 430. The determining section 416 is operable to determine whether a preamble included in a received positioning signal is identical to a preamble assigned to a transmitter other than the transmitters mounted on the GPS satellites.

One example where 24 GPS satellites are used in a position determination system will be described below. In this case, 36 types of pseudo random noise codes including extra codes are used. Further, in cases where a PRN-ID is included in a GPS positioning signal, PRN-01 to PRN-24 may be used as numbers for identifying the respective GPS satellites (PRN-IDs), and PRN-25 to PRN-36 may be used as numbers for identifying respective extra satellites. The extra satellite means a satellite which is further launched in addition to an initially launched satellite. The extra satellite is launched to prepare for possible failure of the GPS satellite or the transmitter and others mounted to the GPS satellite.

Further, for example, 12 types of pseudo random noise code patterns are assigned to transmitters (e.g., the indoor transmitters 200-1, - - - ) other than the transmitter mounted on the GPS satellites, wherein numbers different from the PRN-IDs assigned to the satellites, such as PRN-37 to PRN-48, are assigned to respective ones of the transmitters. In other words, in this example, there are 48 PRN-IDs. For example, the PRN-37 to PRN-48 are assigned to the indoor transmitters, while taking account of an arrangement of the indoor transmitters. Thus, if a transmitter output is set to a level capable of avoiding interference between signals emitted from the indoor transmitters, the same PRN-ID may be used in two or more of the indoor transmitters. Based on such arrangement, the transmitters can be used in a number greater than that of the PRN-IDs assigned to transmitters for use on the ground. Further, the PRN-IDs may be used such that they are included in respective signals from the indoor transmitters, as numbers for identifying the respective indoor transmitters.

The determining section 416 is operable, with reference to the pseudo random noise code patterns stored in the memory 420, to determine whether a code pattern acquired from a received positioning signal is identical to the code pattern assigned to each of the indoor transmitters. If the two code patters are identical to each other, the determining section 416 determines that the received positioning signal is transmitted from one of the indoor transmitters. If not, the determining section 416 determines that the received positioning signal is transmitted from one of the GPS satellites. Then, the determining section 416 is operable, with reference to the code patterns stored in the memory 420, to determine one of the satellites which is assigned with the acquired code pattern. Although an example based on the code patterns has been shown as methodology for the determination, the determination may be made based on comparison of other data. For example, comparison of the PRN-IDs may be used for the determination.

If a received signal is identified as a signal transmitted from one of the GPS satellites, the determining section 416 is operable to send out data acquired from the identified signal, to the outdoor positioning section 432. The data acquired from the identified signal includes a navigation message. Otherwise, if the received signal is identified as a signal transmitted from one of the indoor transmitters, for example, the indoor transmitter 200-1, the determining section 416 is operable to send out data acquired from the identified signal, to the indoor positioning section 434. This data is coordinate values pre-set as data for identifying a position of the indoor transmitter 200-1. In a certain situation, an identification number of this transmitter may be used.

In the navigation processor 430, the outdoor positioning section 432 is operable, based on the data sent out from the determining section 416, to perform a processing for calculating a position of the position information providing apparatus 100. More specifically, the outdoor positioning section 432 is operable, based on data included in signals emitted from three or more (preferably, four or more) GPS satellites, to calculate respective propagation times of the signals, and, based on the calculation result, to calculate a position of the position information providing apparatus 100. This processing is performed using a conventional satellite positioning technique. This processing would be easily understood by those skilled in the art. Thus, its description will be omitted.

In the navigation processor 430, the indoor positioning section 434 is operable, based on the data sent out from the determining section 416, to perform a processing for position determination in cases where the position information providing apparatus 100 is located in an indoor area. The indoor transmitter 200-1 is operable to emit a positioning signal including data for identifying a position (position identification data), as described later. Thus, the position information providing apparatus 100 can receive the positioning signal and extract data included in the signal to identify a position of the position information providing apparatus 100 based on the extracted data. The indoor positioning section 434 performs this processing. Data calculated by the outdoor positioning section 432 or data read out by the indoor positioning section 434 is used for display on the display unit 440. More specifically, these data are incorporated in data for displaying a screen image to generate an image for indicating a measured position or an image for indicating a read position (e.g., an installation location of the indoor transmitter 200-1), and the image is displayed by the display unit 440.

The position information providing apparatus 100 further comprises a communication section 450 for performing data communication with the outside, for example, the local server 204 functioning as a position information providing server, under control of the control section 414.

In the configuration illustrated in FIG. 13, although not particularly limited to the following, in a signal processing between the reception of a position signal and the generation of display information, the antenna 402, the RF front circuit 404, the down-converter 406 and the A/D converter 408 are formed by hardware, and a processing in each of the baseband processor 410 and the navigation processor 430 may be performed according to a program stored in the memory 420. However, in regard to a processing in the correlator section 412, the correlator section 412 may be configured to achieve the processing based on hardware, instead of software.

Figure 14:
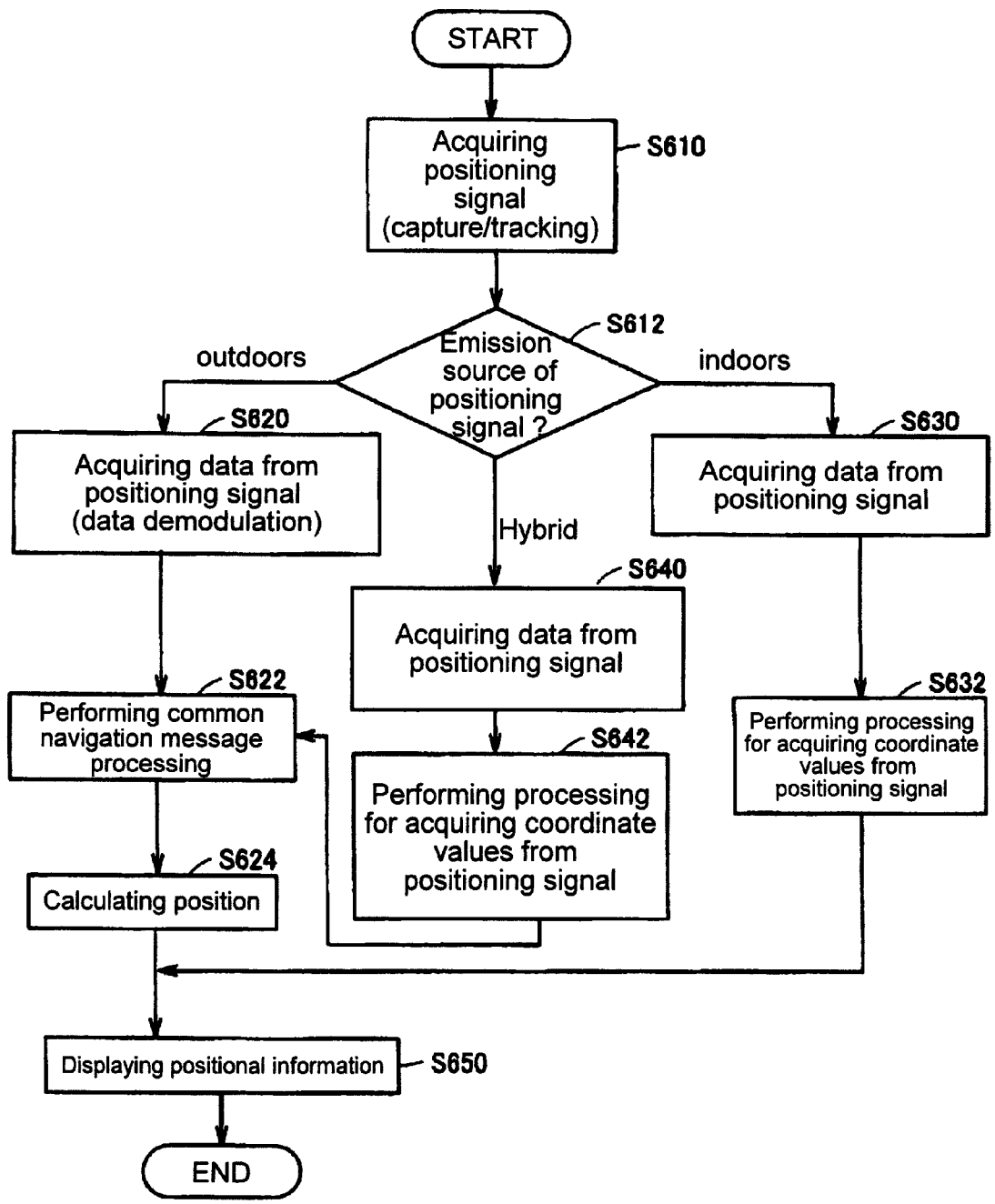
FIG. 14 is a flowchart showing steps of a processing to be performed by the position information providing apparatus 100.

With reference to FIG. 14, a control operation of the position information providing apparatus 100 will be described. FIG. 14 is a flowchart showing steps of a processing to be performed by the baseband processor 410 and the navigation processor 430 of the position information providing apparatus 100.

In Step S610, the position information providing apparatus 100 acquires (tracks and captures) a positioning signal. More specifically, the baseband processor 410 accepts an input of a received positioning signal (digital-converted data) from the A/D converter 408. Then, the baseband processor 410 generates, as replicas of pseudo random noise codes, a plurality of code patterns having different code phases reflecting a possible delay, and detects the presence or absence of correlation between the received positioning signal and each of the code patterns. For example, the number of code patterns to be generated is two times a bit count of the bit patterns. As one example, in cases where a chip rate is 1023 bits, 2046 code patterns having a sequential delay or code-phase difference of ½ bits can be generated. Then, a processing of correlating each of the code patterns with the received signal is performed. In the correlation processing, if an output having an intensity equal to or greater than a predefined value is detected in one of the code patterns, the baseband processor 410 can lock the code pattern, and identify one of the satellites which emits the received positioning signal, based on the locked code pattern. There is only one pseudo random noise code having a bit sequence of the locked code pattern. Thus, a pseudo random noise code used for forming the received positioning signal as a spread spectrum encoded signal is identified.

The processing of correlating a received and acquired signal with each of a plurality of replica code patterns generated inside the position information providing apparatus 100 may also be achieved as a parallel processing, as descried later.

In Step S612, the baseband processor 410 identifies an emission source of the received positioning signal. Specifically, the determining section 416 identifies an emission source of the received positioning signal, based on the PRN-ID associated with one of the transmitters which is assigned with a pseudo random noise code pattern used during modulation for generating the received positioning signal (e.g., using data stored in the memory 420 in FIG. 13). If it is determined that the received positioning signal is emitted from an outdoor area, the control routine is shifted to Step S620. If it is determined that the received positioning signal is emitted in an indoor area, the control routine is shifted to Step S630. Otherwise, if it is determined that the received positioning signal includes a plurality of positioning signals emitted from both the outdoor area and the indoor area, the control routine is shifted to Step S640.

In Step S620, the position information providing apparatus 100 demodulates the positioning signal to acquire data included therein. Specifically, the outdoor positioning section 432 of the navigation processor 430 demodulates the positioning signal using the code pattern temporarily stored in the memory 420 (the code pattern locked in the aforementioned manner; hereinafter referred to as "locked code pattern") to acquire a navigation message from a sub-frame constituting the positioning signal. Then, in Step S622, the outdoor positioning section 432 subjects 4 or more acquired positioning signals to a navigation message processing as a preprocessing of position determination, in a conventional manner.

Then, in Step S624, based on a result of the above processing, the outdoor positioning section 432 performs a processing for calculating a position of the position information providing apparatus 100. For example, in cases where the position information providing apparatus 100 receives positioning signals emitted from 4 or more satellites, a distance calculation is performed using satellite orbit information, clock time information and others included in navigation messages demodulated from respective GPS positioning signals.

Otherwise, in cases where, in Step S612, the position information providing apparatus 100 receives a positioning signal emitted from the satellite (outdoor signal) and a positioning signal from the indoor transmitter (indoor signal), the position information providing apparatus 100 demodulates the positioning signals to acquire data included therein, in Step S640. Specifically, the outdoor positioning section 432 demodulates the positioning signals sent out from the baseband processor 410 using the locked code pattern, to acquire data in a sub-frame constituting each of the positioning signals. In this case, the position information providing apparatus 100 operates in a so-called "hybrid mode", because it receives both the positioning signal from the satellite and the positioning signal from the indoor transmitter. Thus, a navigation message having clock time data is acquired from the positioning signal from the satellite, and data having position information such as the coordinate values is acquired from the positioning signal from the indoor transmitter. More specifically, in Step S642, the indoor positioning section 434 performs a processing of acquiring data, such as a floor number, a latitude, a longitude and an altitude, from the positioning signal emitted from the indoor transmitter 200-1. Further, the indoor positioning section 434 acquires a navigation message from the positioning signal emitted from the GPS satellite and performs a navigation message processing. Then, the control routine is shifted to Step S624. In Step S624, an operation of selecting one of the positioning signals to be used in the position determination is performed based, for example, on respective intensities of the indoor signal and the outdoor signal. For example, if the intensity of the indoor signal is greater than that of the outdoor signal, the indoor signal is selected, and the coordinate values included in the indoor signal are used as a position of the position information providing apparatus 100.

Otherwise, in cases where, in Step S612, the emission source of the received positioning signal is an indoor source, and an intensity of the indoor signal is equal to or greater than a given level, the position information providing apparatus 100 demodulates the positioning signal to acquire data included therein, in Step S630. Specifically, the indoor positioning section 434 demodulates the positioning signal sent out from the baseband processor 410, using the locked code pattern, to acquire a message data in a sub-frame constituting the positioning signal. This message data is included in a positioning signal emitted from the indoor transmitter, as substitute for the navigation messages included in the positioning signals emitted from the satellites.

Then, in Step S632, the indoor positioning unit 434 acquires coordinate values from the message data (i.e., acquires data for identifying an installation location of the indoor transmitter (e.g., a floor number, a latitude, a longitude and an altitude)). Subsequently, the routine is shifted to Step S650.

If the position information providing apparatus 100 receives a short ID message and a medium ID message in Step S630, the position information providing apparatus 100 demodulates the positioning signal to acquire data included therein, in Step S630. Then, in Step S632, the position information providing apparatus 100 transmits the short ID message to the local server 204 via a network, based on the medium ID message, and receives position information corresponding to the short ID message.

In Step S650, based on a result of the position determination, the navigation processor 430 performs a processing for displaying the position information on the display unit 440. Specifically, the navigation processor 430 generates image data for indicating the acquired coordinate or data for indicating the installation location of the indoor transmitter 200-1, and sends out the data to the display unit 440. Based on the data, the display unit 440 displays the position information of the position information providing apparatus 100 on a display area.

Figure 15:
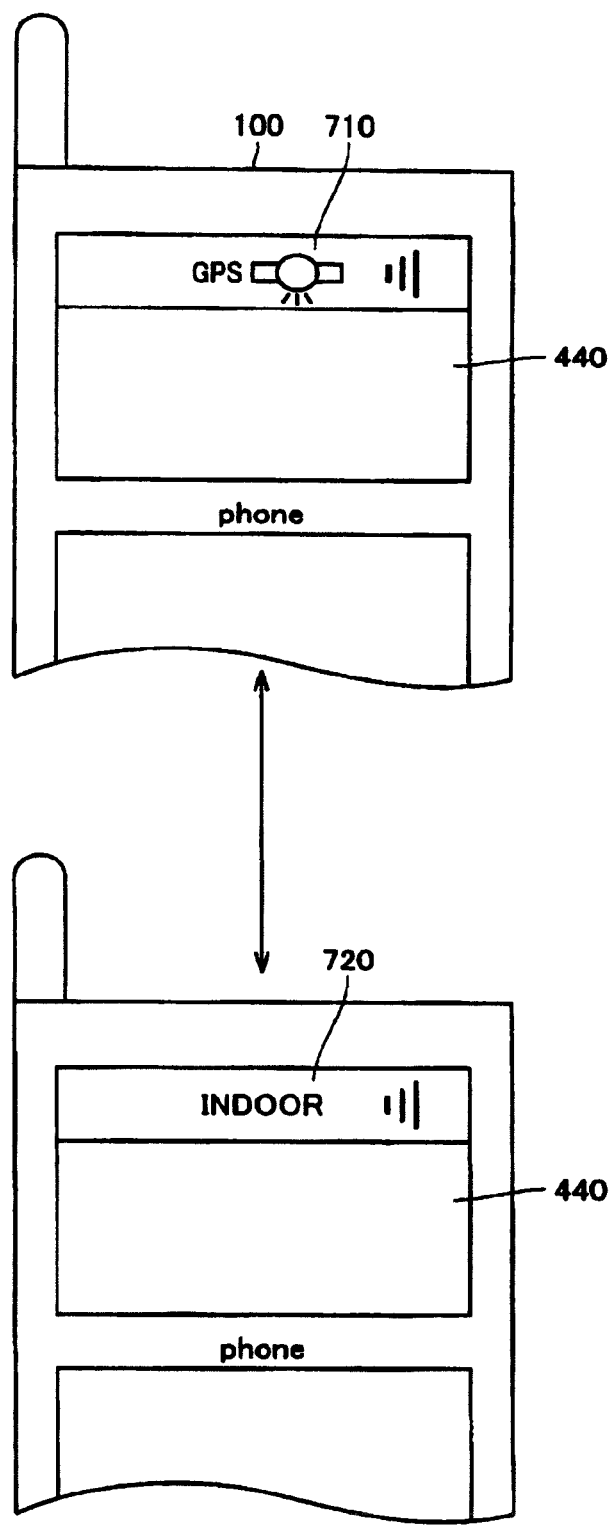
FIG. 15 is a diagram showing a screen image on a display unit 440 of the position information providing apparatus 100.

With reference to FIG. 15, a display mode of the position information of the position information providing apparatus 100 will be described. FIG. 15 is a diagram showing a screen display on the display unit 440 of the position information providing apparatus 100. When the position information providing apparatus 100 receives positioning signals emitted from the GPS satellites in an outdoor area, the display unit 440 displays an icon 710 indicating that position information is acquired based on the GPS positioning signals. Then, when a user of the position information providing apparatus 100 moves to an indoor area, the position information providing apparatus 100 becomes unable to receive positioning signals emitted from the GPS satellites. Instead, the position information providing apparatus 100 receives a signal emitted, for example, from the indoor transmitter 200-1. This signal is being transmitted in the same mode as that of positioning signals to be emitted from the GPS satellites, as mentioned above. Thus, the position information providing apparatus 100 performs a processing for the signal in a manner similar to a processing to be performed when positioning signals from the GPS satellites are received. After the position information providing apparatus 100 acquires position information from the signal, the display unit 440 will display an icon 720 indicating that the position information is acquired based on a signal emitted from a transmitter installed in an indoor area.

As described above, in a location where it is impossible to receive radio waves, such as an inside area of a building or an underground shopping area, the position information providing apparatus 100 in the first embodiment is operable to receive radio waves emitted from a transmitter installed therein (e.g., one of the indoor transmitters 200-1 to 200-3 or one of the indoor transmitters 200-4 to 200-6). Then, the position information providing apparatus 100 is operable to acquire information identifying a position of the transmitter (e.g., coordinate values or mail address) and display the information on the display unit 440. Based on the displayed information, a user of the position information providing apparatus 100 can know a current position. Thus, it becomes possible to provide position information even in a location where it is impossible to directly receive satellite positioning signals.

This makes it possible to ensure stable signal receiving in an indoor area, and provide position information with stable accuracy of about several meters even in an indoor area.

In addition, a clock time on the ground (clock time of a transmitter such as the indoor transmitter 200-1) and a clock time of a satellite may be independent of each other, i.e., are not required to be synchronized with each other. Thus, it becomes possible to suppress an increase in production cost of an indoor transmitter. Further, there is no need to synchronize clock times of a plurality of indoor transmitters, which facilitates system management.

Information for directly identifying an installation location of each of a plurality of indoor transmitters is included in a signal to be transmitted from each of the indoor transmitters, which eliminate a need for calculating position information from signals emitted from a plurality of satellites. Thus, it becomes possible to derive positioning signal based on a signal emitted from one of the indoor transmitter.

Further, a signal-receiving position can be identified by receiving a signal emitted from one of the indoor transmitters, which makes it possible to more easily achieve a position information providing system as compared with the conventional satellite-based position determination systems, such as the GPS.

In the position information providing apparatus 100, hardware achieving the conventional position determination systems can be used to receive a signal transmitted from the indoor transmitter 200-1, without a need for dedicated hardware, and a signal processing can be achieved by changing or modifying software. Thus, there is no need to start design of hardware from zero to use techniques related to the first embodiment. This makes it possible to suppress an increase in cost of the position information providing apparatus 100, which facilitates popularization of the position information providing apparatus 100. Further, it becomes possible to provide a position information providing apparatus capable of preventing an increase in circuit size and complexity in circuit configuration.

More specifically, the memory 420 of the position information providing apparatus 100 holds the predefined PRN-IDs and the code patterns for the indoor transmitters and/or the satellites, in associated relation. The position information providing apparatus 100 is operable, according to a program, to perform a processing for determining whether received radio waves are emitted from the satellite or the indoor transmitter, based on the PRN-IDs. This program is achieved by a processing unit, such as the baseband processor. Alternatively, the position information providing apparatus 100 may be configured by changing a circuit element for the determination to a circuit element including a function to be achieved by the program.

In cases where the position information providing apparatus 100 is embodied as a mobile phone, the acquired information may be held in a nonvolatile memory 420, such as a flash memory. Then, when a call is sent out from the mobile phone, the data held in the memory 420 may be transmitted to a recipient. In this case, position information about the caller, i.e., position information acquired from the indoor transmitter by the position information providing apparatus 100 is transmitted to a base station relaying the call. The base station stores the position information together with receiving date/time as a call log. Further, if a caller is an emergency contact number (e.g., 110 in Japan), position information of the caller may be directly notified. Thus, the notification of a caller from a mobile can be achieved in the same manner as that in conventional notification of a caller from a fixed-phone during emergency contact.

In regard to a transmitter to be installed in a specific location, the position information providing system is achieved by use of a transmitter capable of emitting a signal similar to a signal to be emitted from a transmitter mounted on a satellite for position determination. Thus, it becomes possible to eliminate a need for newly starting design of a transmitter from zero.

In the position information providing system 10 according to the first embodiment, a spread spectrum signal is used as a positioning signal. In transmission of the spread spectrum signal, an electric power per frequency can be reduced. Thus, as compared with a conventional RF tag, management of radio wave would become easier. This makes it possible to facilitate establishment of a position information providing system.

In the indoor transmitter 200-1, a setting parameter can be changed after installation thereof. Thus, for example, position identification data for identifying an installation location can be collectively rewritten after the installation, which makes it possible to simplify an installation process. Further, among information to be transmitted as messages, "advertisement data", "traffic information", "weather information" and/or "disaster information (e.g., earthquake information)" can be provided to a receiver while being rewritten in real time. Thus, various services can be achieved. Additionally, in the indoor transmitter 200-1, firmware of the FPGA 245 for performing a signal processing can be directly rewritten. Thus, the same hardware can be used in communication schemes (modulation schemes) in various position determination systems. Further, the use of the short ID message and the medium ID message makes it possible to acquire various position-related information from the local server 204.

<First Modification of Receiver>

In place of the configuration of the correlator unit 412 provided in the position information providing apparatus 100, a plurality of correlators may be used. In this case, a processing for matching replicas with positioning signals is performed in a simultaneous parallel manner, so that a calculation time for position information can be reduced.

FIG. 14 is a block diagram showing a configuration of the above modification of the position information providing apparatus 100.

A position information providing apparatus 1000 according to the modified embodiment comprises: an antenna 1010; a band-pass filter 1020 electrically connected to the antenna 1010; a low-noise amplifier 1030 electrically connected to the band-pass filter 1020; a down-converter 1040 electrically connected to the low-noise amplifier 1030; a band-pass filter 1050 electrically connected to the down-converter 1040; an A/D converter 1060 electrically connected to the band-pass filter 1050; a parallel correlator 1070 composed of a plurality of correlators and electrically connected to the A/D converter 1060; a processor 1080 electrically connected to the parallel correlator 1070; and a memory 1090 electrically connected to the processor 1080.

The parallel correlator 1070 includes n correlators 1070-1 to 1070-$n$. The correlators are operable, based on a control signal output from the processor 1080, to perform a processing of matching each of a plurality of received positioning signals with respective ones of a plurality of code patterns generated to demodulate the positioning signal, in a simultaneous parallel manner.

Specifically, the processor 1080 is operable to give an instruction for generating a plurality of code patterns reflecting a possible delay occurring in a pseudo random noise code (having sequentially delayed code phases) to the correlators of the parallel correlator 1070. For example, in the existing GPS, this instruction corresponds to the member of satellites× 2×1023 (length of a pseudo random noise code pattern to be used). According to the instruction given to each of the correlators of the parallel correlator 1070, the parallel correlator 1070 generates a plurality of code patterns different in code phase using pseudo random noise code patterns set in the satellites. Consequently, in the entire generated code patterns, there is one code pattern identical to a pseudo random noise code pattern used for modulation of a received positioning signal. Therefore, the pseudo random noise code pattern can be instantaneously identified by use of the parallel correlator 1070 made up of a plurality of correlators required for performing a matching processing using the code patterns. This operation can also be applied to an operation to be performed when the position information providing apparatus 100 receives a signal from the indoor transmitter. In this case, even if a user of the position information providing apparatus 100 is in an indoor area, position information thereof can be instantaneously acquired.

In other words, the parallel correlator 1070 can perform the matching processing for all of the pseudo random noise code patterns set in the satellites and the pseudo random noise code patterns set in the indoor transmitters, in a simultaneous parallel manner, at its best. Further, even in cases where the matching processing is not performed for all of the pseudo random noise code patterns set in the satellites and the indoor transmitters, in consideration of a relationship between the number of correlators and the numbers of pseudo random noise code patterns assigned to the satellites and the indoor transmitters, a time required for acquiring position information can be significantly reduced based on the simultaneous parallel processing using the plurality of correlators.

In this modified embodiment, the satellites and the indoor transmitters are transmitting signals in a spread spectrum scheme, i.e., the same communication scheme, so that pseudo random noise code patterns belonging in the same category can be used as those to be assigned to the satellites and the indoor transmitters. Thus, the parallel correlator can be used for both a signal from each of the satellites and a signal from one of the indoor transmitters to perform a receiving processing in a simultaneous parallel manner without particular distinction between the signals.

Figure 16:
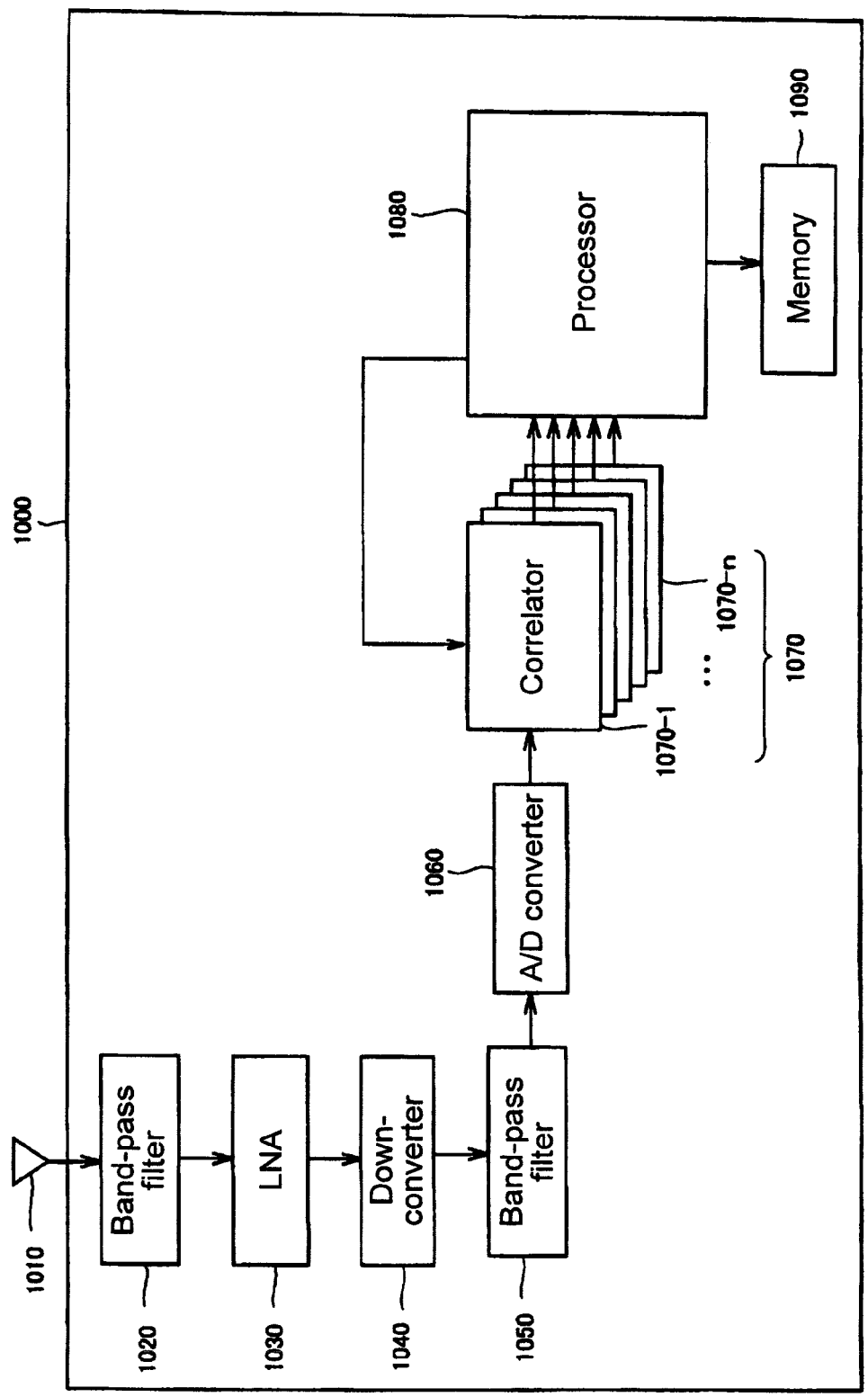
FIG. 16 is a block diagram showing a configuration of a position information providing apparatus 1000 according to a first modified embodiment of the present invention.

Although not particularly limited to the following, in the position information providing apparatus 1000 illustrated in FIG. 16, the antenna 1010, the band-pass filter 1020, the low-noise amplifier (LNA) 1030, the down-converter 1040, the band-pass filter 1050, the A/D converter 1060, and the parallel correlator 1070 for a signal processing between the reception of a position signal and the generation of information to be displayed on a display unit (which is not illustrated in FIG. 16) may be formed by hardware, and a processing for position determination (the control process illustrated in FIG. 14) may be performed by the processor 1080 according to a program stored in the memory 1090.

<Second Modification of Receiver>

A second modified embodiment of the receiver according to the present invention will be described below. The second modified embodiment will be described based on an example where a mobile phone is used as the position information providing apparatus 100.

A position information providing apparatus according to the second modified embodiment is obtained by modifying software of a conventional mobile phone. In the position information providing apparatus according to the second modified embodiment, when a short ID message is transmitted to the local server 204 as an apparatus for providing information about an indoor transmitter, based on a medium ID message, instead of identifying a position of the position information providing apparatus based on data included in a signal from the indoor transmitter, a process of acquiring position information is performed by communication using a portable phone. In the second modified embodiment, a position of the mobile phone can also be identified based on a short ID message and a medium ID message. While a position of a mobile phone is generally determined as an area of a base station which has received a signal emitted from the mobile phone, the mobile phone according to the second modified embodiment can determine a position of the mobile phone itself. For example, even in a local region where there is a few number of base stations, it becomes possible to accurately determine a position of a mobile phone based on a short ID message and a medium ID message.

In the second modified embodiment, a configuration or process for performing position determination based on positioning signals from satellites is the same as that in the first embodiment. Thus, an operation to be performed when a short ID message and a medium ID message are received from an indoor transmitter will be primarily described below.

Figure 17:
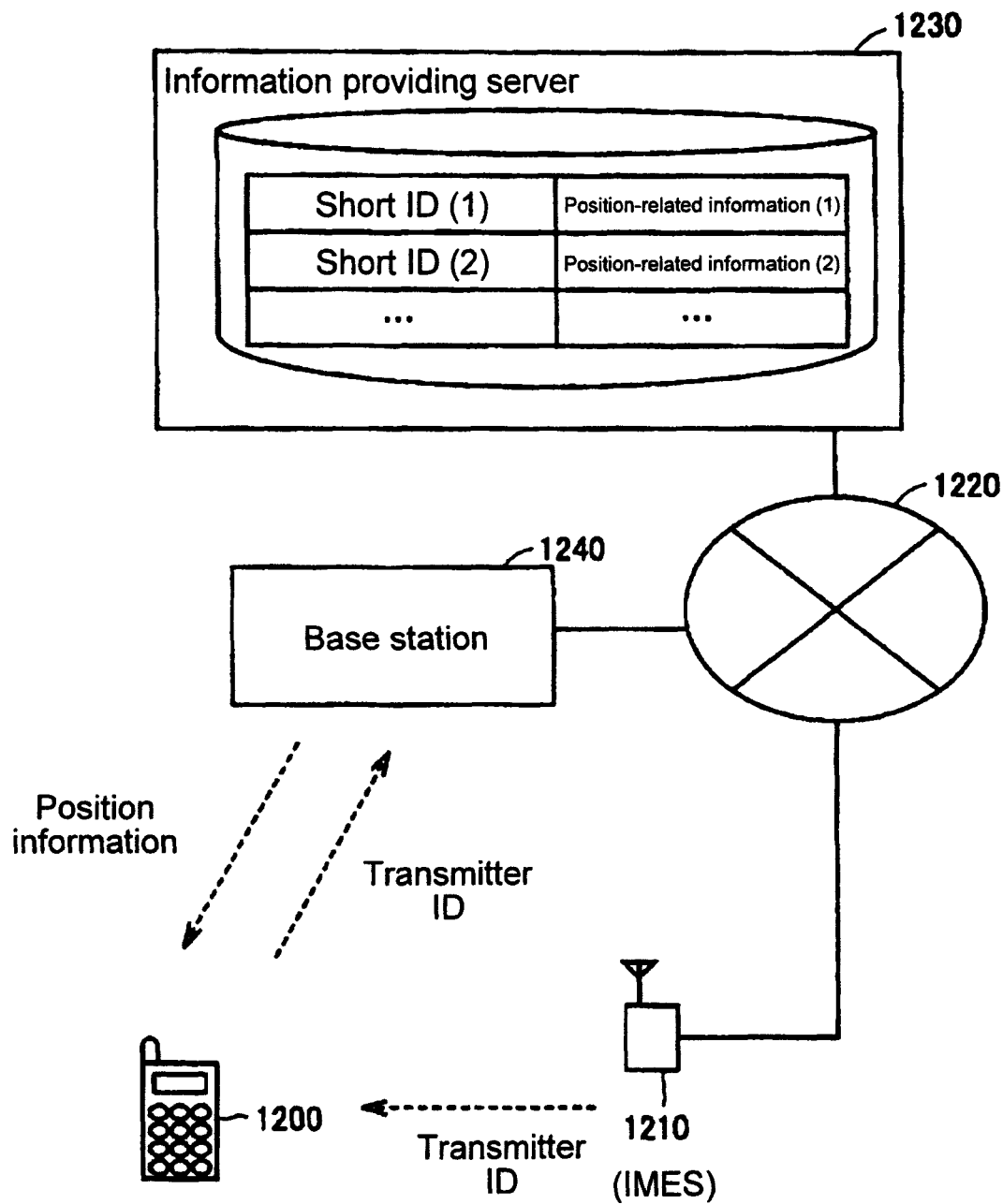
FIG. 17 is a block diagram showing a usage state of a position information providing apparatus in a second modified embodiment of the present invention.

FIG. 17 is a diagram showing a usage state of the position information providing apparatus according to the second modified embodiment. The position information providing apparatus is embodied as a mobile phone 1200. The mobile phone 1200 is adapted to be capable of receiving a positioning signal emitted from an indoor transmitter 1210. The indoor transmitter 1210 is connected to the Internet 1220. Further, an information providing server 1230 (equivalent to the local server 204 in FIG. 1) capable of providing information about the indoor transmitter 1210 is connected to the Internet 1220. The following description will be made on an assumption that a plurality of short ID messages and position-related information associated with of respective ones of the short ID messages are registered on database of the information providing server 1230. Further, a base station 1240 communicatable with the mobile phone 1200 is connected to the Internet 1220.

Upon receiving a signal emitted from the indoor transmitter 1210, the mobile phone 1200 acquires a short ID message and a medium ID message from the received signal. Based on the medium ID message, the mobile phone 1200 transmits the short ID message to the information providing server 1230.

After recognizing the received short ID message, the information providing server 1230 refers to database associated with the short ID message and reads out position-related information associated with an ID thereof. The information providing server 1230 transmits the data to the base station 1240, and then the base station 1240 transmits the data. After detecting incoming of the data, the mobile phone 1200 can acquire a position of the indoor transmitter 1210 and information related to the position based on the received data, according a viewing operation by a user of the mobile phone 1200.

Figure 18:
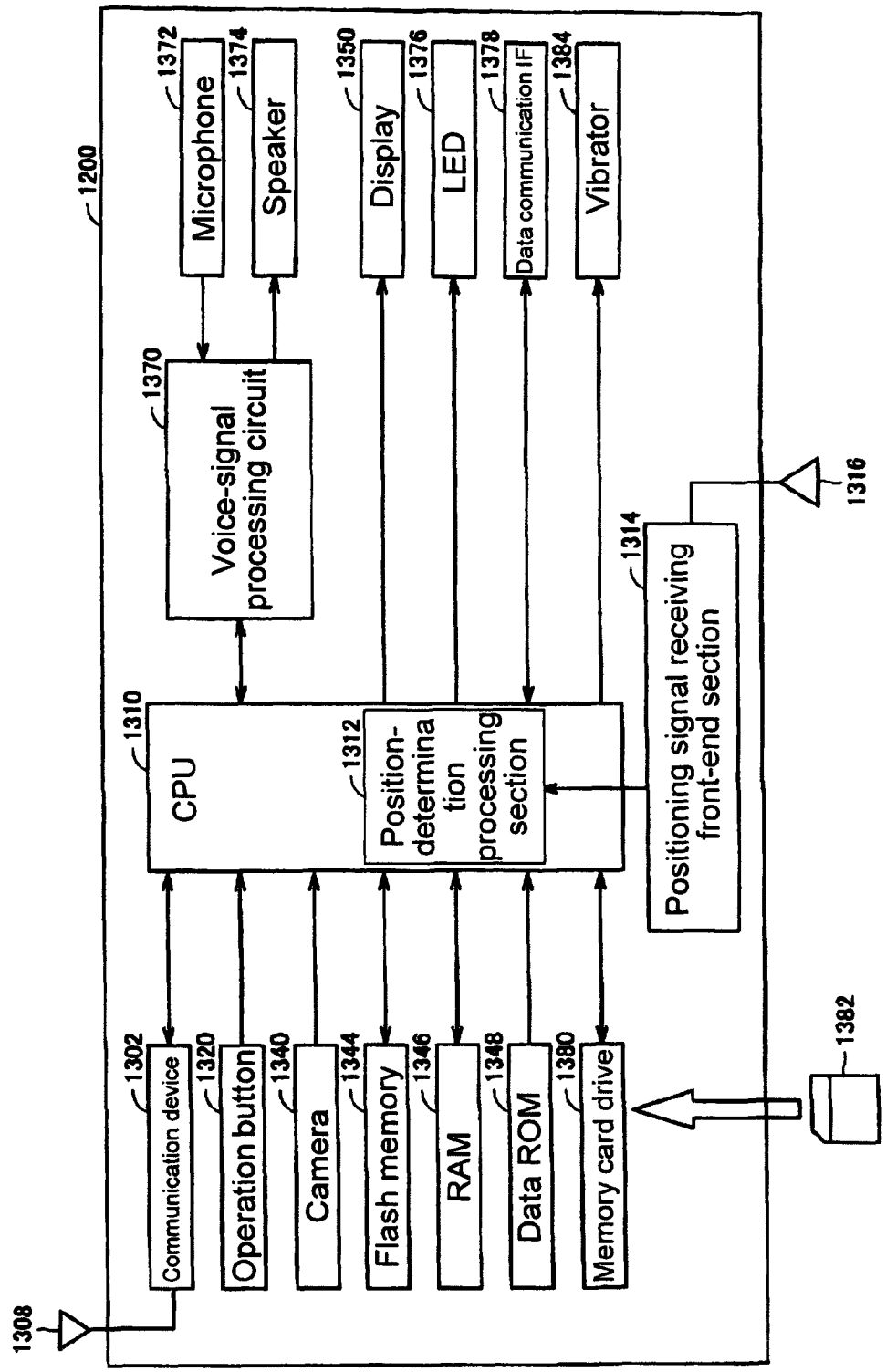
FIG. 18 is a block diagram a hardware configuration of a mobile phone 1200 in the second modified embodiment.

With reference to FIG. 18, a configuration of the mobile phone 1200 will be described. FIG. 18 is a block diagram showing a hardware configuration of the mobile phone 1200. The mobile phone 1200 comprises: an antenna 1308, a communication device 1302, a CPU 1310, an operation button 1320, a camera 1340, a flash memory 1344, a RAM 1346, a data ROM 1348, a memory card drive 1380, a voice-signal processing circuit 1370, a microphone 1372, a speaker 1374, a display unit 1350, an LED (Light-Emitting device) 1376, a data communication IF 1378 and a vibrator 1384, which are electrically connected to each other.

A signal received by the antenna 1308 is transferred to the CPU 1310 by the communication device 1302. The CPU 1310 is operable to transfer the signal to the voice-signal processing circuit 1370. Then, the voice-signal processing circuit 1370 is operable to subject the signal to a predefined signal processing, and then send the processed signal to the speaker 1374. The speaker 1374 is operable, based on the processed signal, to output voice.

The microphone 1372 is operable to accept voice generated toward the mobile phone 1200, and output a signal corresponding to the generated voice to the voice-signal processing circuit 1370. The voice-signal processing circuit 1370 is operable, based on the signal, to perform a predefined signal processing for call, and send out a processed signal to the CPU 1310. Then, the CPU 1310 is operable to convert the processed data into transmission data, and send out the transmission data to the communication device 1302. The communication device 1302 is operable to transmit the signal through the antenna 1308, and then the base station 1240 is operable to receive the signal.

The flash memory 1344 is adapted to store therein data sent from the CPU 1310. Reversely, the CPU 1310 is operable to read out data stored in the flash memory 1344, and perform a predefined processing using the data.

The RAM 1346 is adapted to temporarily store therein data generated by the CPU 1310, according to a manual operation performed against the operation button 1320. The data ROM 1348 pre-stores therein data or a program for allowing the mobile phone 1200 to perform a predetermined operation. The CPU 1310 is operable to read the data or the program from the data ROM 1348 to allow the mobile phone 1200 to perform the predetermined operation.

The memory card drive 1380 is adapted to accept a loading of a memory card 1382. The memory card drive 1380 is operable to read out data stored in the loaded memory card 1382, and send out the readout data to the CPU 1310. The memory card drive 1380 is also operable to reversely write data output by the CPU 1310, in a data storage area ensured in the memory card 1382.

The voice-signal processing circuit 1370 is operable to perform a processing for a signal to be used for the call as mentioned above. The CPU 1310 and the voice-signal processing circuit 1370 may be integrated together.

The display unit 1350 is adapted, based on data output from the CPU 1310, to display an image defined by the data. For example, in cases where the flash memory 1344 stores therein data (e.g., URL) for accessing the information providing server 1230, the display unit 1350 displays the URL.

The LED 1376 is adapted to achieve a predetermined light-emitting action based on a signal from the CPU 1310. For example, the LED 1376 may be configured to be capable of indicating a plurality of colors. In this case, the LED 1376 is operable, based on data included in a signal output from the CPU 1310, to emit light with a color associated with the data.

The data communication IF 1378 is adapted to accept an attachment of a cable for data communication. The data communication IF 1378 is operable to send out a signal output from the CPU 1310, to the cable attached thereto. The data communication IF 1378 is also operable to send out data received through the cable, to the CPU 1310.

The vibrator 1384 is adapted to generate vibration at a predetermined frequency based on a signal output from the CPU 1310. A fundamental operation of the mobile phone 1200 would be easily understood by those skilled in the art. Thus, its detailed description will be omitted.

The mobile phone 1200 further comprises a positioning signal-receiving antenna 1316 and a positioning signal-receiving front-end section 1314.

The positioning signal-receiving front-end section 1314 comprises the antenna 402, the RF front circuit 404, the down-converter 406 and the A/D converter 408, which have been described as components to be achieved by hardware in the position information providing apparatus 100 illustrated in FIG. 13. Further, the processing in each of the baseband processor 410 and the navigation processor 430 which has been described as a processing to be achieved by software in the position information providing apparatus 100, can be performed by a position-determination processing circuit 1312 on the CPU 1310 according to a program loaded from the flash memory 1344 onto the RAM 1346. In this configuration, the correlator section 412 may also be configured to achieve the processing therein, based on hardware, instead of software. Further, the same hardware and software configurations as those in the position information providing apparatus 1000 illustrated in FIG. 16 may also be employed.

Figure 19:
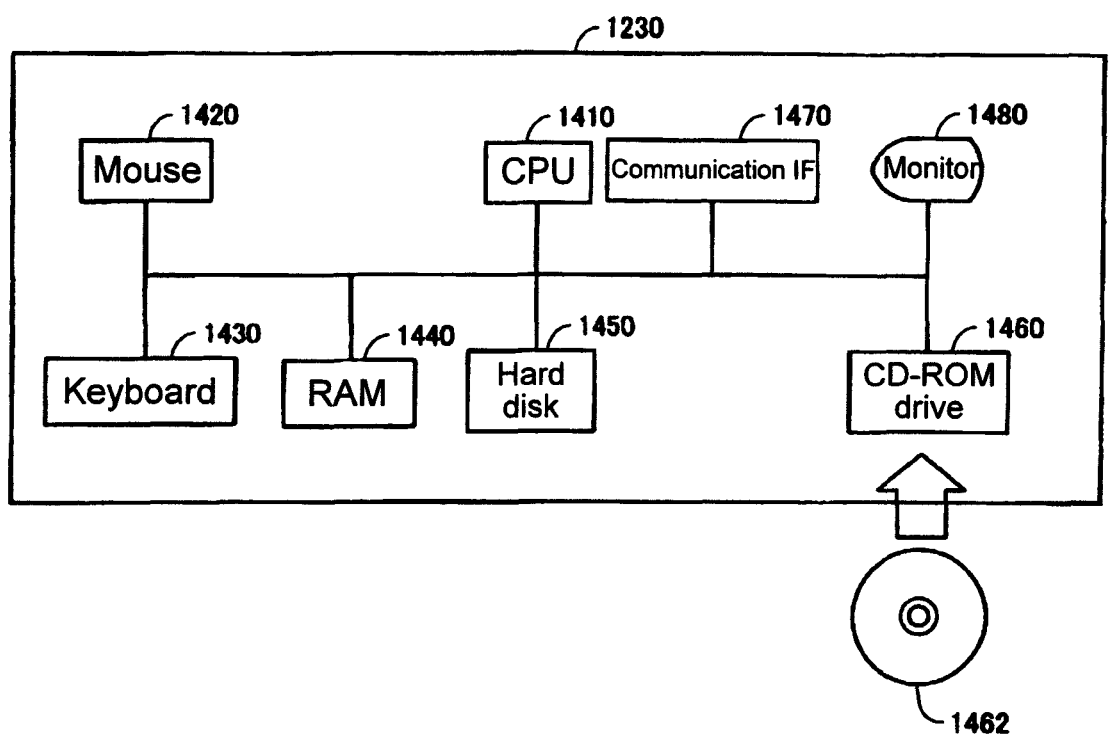
FIG. 19 is a block diagram showing a hardware configuration of an information providing server 1230 in the second modified embodiment.

With reference to FIG. 19, a specific configuration of the information providing server 1230 will be described. FIG. 19 is a block diagram showing a hardware configuration of the information providing server 1230. For example, the information providing server 1230 may be achieved by a conventional computer system.

As major hardware, the information providing server 1230 comprises: a CPU 1410; an input device including a mouse 1420 and a keyboard 1430 for accepting an input instructed by a user of the information providing server 1230; a RAM 1440 for temporarily storing therein data generated based on a program executed by the CPU 1410 or data input through the mouse 1420 or the keyboard 1430; a hard disk 1450 storing therein a large volume of data in a nonvolatile manner; a CD-ROM (Compact Disk-Read Only Memory) drive 1460; a monitor 1480; and a communication IF 1470. These hardware components are connected to each other by a data bus. A CD-ROM 1462 is attached to the CD-ROM drive 1460.

A processing in the computer system achieving the information providing server 1230 is achieved by the hardware and software to be executed by the CPU 1410. The software may be pre-stored in the hard disk 1450. Alternatively, the software may be a type which is stored in the CD-ROM 1462 or other data recording medium as a commercially-available program product. Alternatively, the software may be a type which is provided as a downloadable program product by an information provider connected to the Internet. The software is read out from the data recording medium by the CD-ROM drive 1460 or other data reading device, or downloaded via the communication IF 1470, and temporarily stored in the hard disk 1450. Then, the software is read out from the hard disk 1450 by the CPU 1410, and stored in the RAM 1440 in the form of an executable program. The CUP 1410 is operable to execute the program.

The hardware of the computer system achieving the information providing server 1230, illustrated in FIG. 19, is a commonly-used type. Thus, it can be said that a substantial part of the information providing server 1230 in the second modified embodiment is software stored in the RAM 1440, the hard disk 1450, the CD-ROM 1460 or other data recording medium, or software downloadable via a network. An operation of the hardware of the computer network is well known. Thus, its detailed description will be omitted.

The recording medium is not limited to the CD-ROM 1462 and the hard disk 1450, but may be a medium capable of fixedly carrying a program, such as a magnetic tape, a cassette tape, an optical disk (MO (Magnetic Optical Disk/MD (Mini Disk)/DVD (Digital Versatile Disk)), an IC (Integrated Circuit) card (including a memory card), an optical card, or a semiconductor memory including a mask ROM, an EEPROM and a flash ROM.

As used herein, the term "program" is not limited to a program executable directly by the CPU 1410, but includes a source program type, a compressed program, and an encrypted program.

The short ID messages and the position-related information associated with the short ID messages are registered on the hard disk 1450, as mentioned above.

As above, in the position information providing system according to the second modified embodiment, a signal emitted from an indoor transmitter installed on or under the ground includes data about a short ID message and a medium ID message, depending on situations. This data is stored in a server apparatus for providing position information of the indoor transmitter, in a manner associated with position-related information. The mobile phone 1200 functioning as a position information providing apparatus transmits a short ID message to the server apparatus to acquire position information of the indoor transmitter or information related to a position of the indoor transmitter. The use of this information providing technique makes it possible to eliminate a need for allowing position information of an indoor transmitter to be held by the indoor transmitter itself, and therefore facilitate changing an installation position of an indoor transmitter.

<Modification of Signal Specifications of IMES Signal>

Although the IMES signal specifications have been described with reference to FIGS. 5 to 12, the following IMES signal specifications may also be employed.

The following description will be made primarily about a difference between respective signal specifications of a modified IMES signal and the IMES signal described in connection with FIGS. 5 to 12.

i) Structure for Ensuring High Reliability of Indoor Position Information (Prevention of Erroneous Synchronization) and Ensuring High Reliability of Indoor Position Information (Prevention of Erroneous Capture)

In the modified IMES signal, a counter bit having a given bit length, e.g., a 3-bit length, is provided in each word except a leading word in a frame, and a count value is incremented every time each word is transmitted. When the count value is counted up to 111, the count-up operation will be restarted from 000.

A preamble of an indoor-transmitter message included in the leading word is set to a value different from that of a preamble of a GPS or QZSS signal.

The above different preambles make it possible to quickly recognize erroneous capture. Further, the count-up operation makes it possible to eliminate a situation where a given relationship between a preamble and a parity at a rail end of a word becomes contingently satisfied at a position other than a proper position and will repeatedly appear, and reliably detect a head of a frame to establish frame synchronization so as to prevent erroneous position information from being output.

ii) Indoor/Outdoor Identification-Assist Flag (Power Saving of Receiver)

Constant search/capture/tracking of indoor and outdoor signals by a multi correlator impose a large load on an apparatus requiring power saving, such as a mobile phone. Thus, it is desirable to, in an indoor area, search only an indoor signal, and, in an outdoor area, search a satellite signal while performing a code search for an indoor signal using at least one channel. A 1-bit outdoor/indoor identification-assist flag is incorporated in a message of an indoor signal. When an indoor transmitter is installed in an outdoor area or in a cell bordering an outdoor area, the flag is set to "1". A receiver is operable, when the flag is "1", to start a code search for capturing an outdoor satellite signal, and, when the flag is "0", to terminate the code search for capturing an outdoor satellite signal.

The outdoor/indoor identification-assist flag will be more specifically described below. For example, a commonly-used GPS receiver mounted on a mobile phone has eight channels, so that it is capable of simultaneously capturing/tracking eight satellites. Generally, in such a receiver, a plurality of correlators are employed to reduce a time required for frequency and code searches for capturing satellite signals.

As a prerequisite to reducing a time for acquisition of position information during movement between indoor and outdoor areas, it is necessary to constantly search a first positioning signal from a satellite and a second positioning signal from an indoor transmitter.

In this normal state, for example, a given percentage (e.g., 20%; in the above 8-channel receiver, it corresponds to two channels) of the correlators in the receiver perform a search based on PRN codes assigned to indoor transmitters, and the remaining percentage (e.g., 80%; in the above receiver, it corresponds to six channels)) of the correlators perform a search based on PRN codes assigned to satellites.

The searches are constantly performed at the above percentages for the following reason. When the second positioning signal can be captured, position information can be immediately output from position information obtained from a message in the second positioning signal. Thus, it is desirable to constantly perform the code search for an indoor transmitter using about 20% of the correlators. If the search based on the PRN codes assigned to indoor transmitters is not constantly performed, the following situation occurs. When a user moves to an indoor area and it becomes impossible to adequately receive GPS signals, the search based on the PRN codes assigned to indoor transmitters is started only after the search for capturing satellite signals is sequentially performed and then it is determined that GPS signals cannot be adequately received. Thus, before making the shift to acquisition of position information of an indoor transmitter, positioning signals from satellites are received to perform position determination, so that position information having a large error is output due to influences of multipath and reflected waves.

Further, in order to quickly capture satellite signals when a user moves from an indoor area to an outdoor area, it is necessary to perform the search for satellite signals based on PRN codes from the satellites, in addition to the search based on PRN codes assigned to indoor transmitters. In this case, it is desirable to increase a percentage of correlators performing the search based on PRN codes assigned to indoor transmitters. For example, it is preferable that 20% of the correlators are used for the search based on PRN codes assigned to satellite, and 80% of the correlators are used for the search based on PRN codes assigned to indoor transmitters.

However, in a battery-powered position information providing apparatus such as a mobile phone, it is inefficient to constantly perform the search and the signal capture/tracking using the entire correlators. If it can be known that a user is surely in an indoor area, the number of correlators performing the search can be reduced to cut power consumption. For example, even if only about 20% of the correlators is activated, i.e., the search for an indoor transmitter is performed using only about two channels in the above 8-channel receiver, position information can be acquired in an indoor area within a shorter period of time without subjecting a user to stress, while suppressing consumption of a battery.

Therefore, the "outdoor/indoor identification-assist flag" (BD bit) is incorporated in a signal to be transmitted from an indoor transmitter, wherein the BD bit is set to "1" for one or two indoor transmitters located in a boundary when a user moves between indoor and outdoor areas, and to "0" for an indoor transmitter located in the remaining region of the indoor area (exactly located in an indoor area).

The receiver is adapted, when the BD bit is "1", to start the search for outdoor positioning signals, and, when the BD bit is "0", to terminate the search. Thus, it becomes possible to satisfy both a need for efficiently reducing battery consumption and a need for reducing a time required for acquisition of position information during movement between indoor and outdoor areas.

(Signal Specifications of IMES Signal)

A structure of a modified signal to be transmitted from the indoor transmitter 200-1 (modified IMES signal) will be more specifically described below.

The modified IMES signal has an RF characteristic corresponding to that of a positioning signal from a satellite (e.g., an L1-band C/A code of the GPS or QZSS). While the modified IMES signal is the same as the satellite positioning signal in that a structure of a navigation message has a 30-bit word as a basic unit, it has a delimited short frame structure to provide a shorter TTRM. This point is the same as the signal specifications of the IMES signal described in connection with FIGS. 5 to 12.

Thus, (1) RF Characteristic is the same as that described above, and its description will be omitted. The following description will be made about a message characteristic.

(3) Message Characteristic (3-1) Word Structure

One word consists of the same word length as that of the satellite positioning signal, e.g., 30 bits. In cases where one word consists of 30 bits, one word includes 21-bit data, a 3-bit word counter, and a 6-bit parity.

(3-2) Word Counter

Each word, except a leading word in a frame, has a word counter. The FPGA 245 of the indoor transmitter 200-1 is operable, every time each word is transmitted, to increment a value of the word counter by a given value, e.g., by one.

The word counter assists an identification of word and frame delimiters. In order to assist the identification of the delimiters, the 3-bit word counter is configured such that it does not take the same value as that of the higher-order 3 bits of the preamble, i.e., it skips the value.

(3-3) Parity Code and (2-4) Parity Algorithm and Parity Check Algorithm are the same as those in the signal specifications of the IMES signal described in connection with FIGS. 5 to 12

(3-4) Frame Structure

Figure 20:
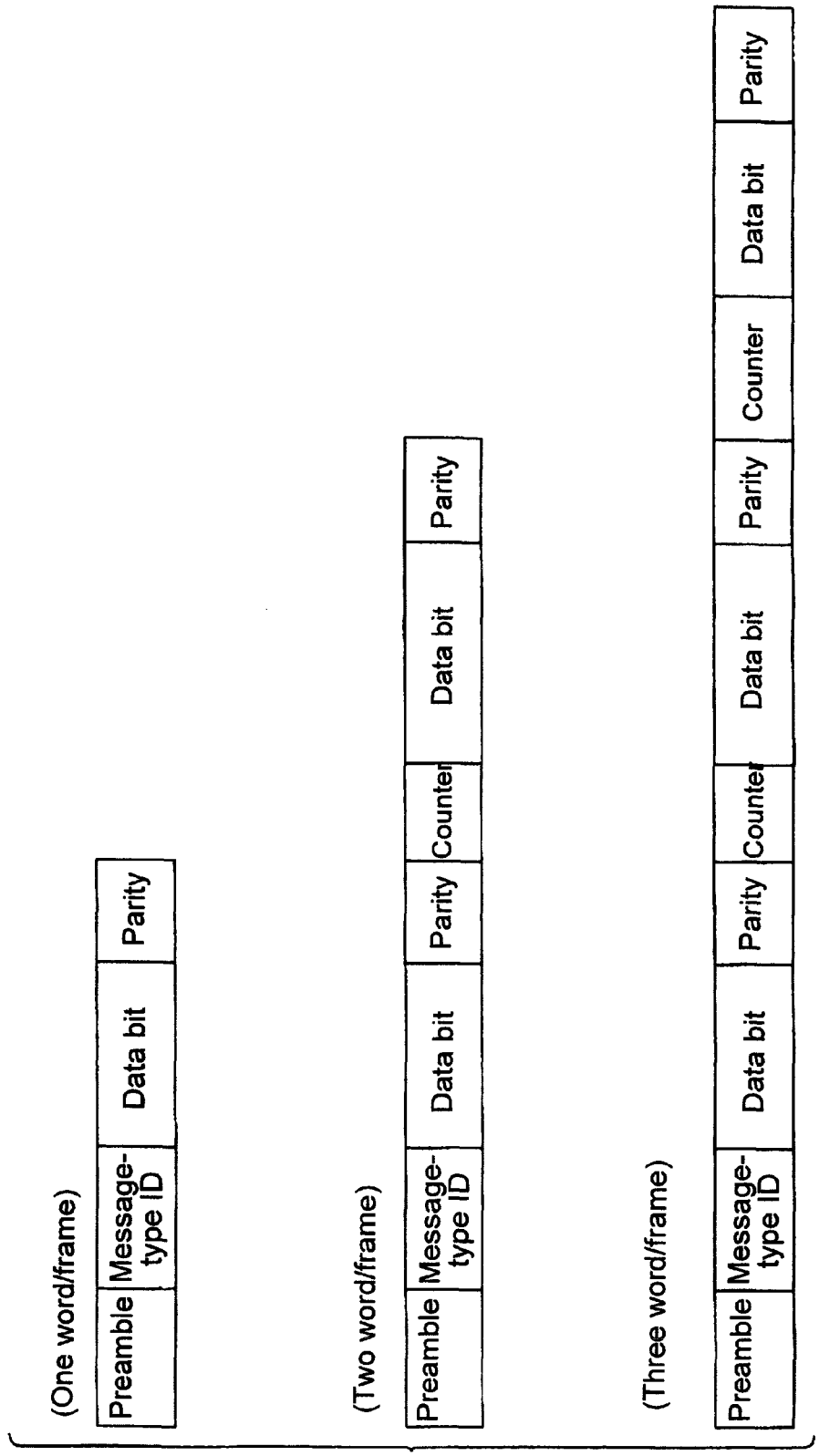
FIG. 20 is a diagram showing a frame structure of a modified IMES signal.

FIG. 20 is a diagram showing a frame structure of the modified IMES signal.

One frame consists of an integral multiplication of the word, and has the following format. The frame having the illustrated structure is transmitted sequentially and repeatedly.

In the 1st word, there is a preamble having a given bit length, e.g., an 8-bit length, and the preamble is followed by a message-type ID (MID) having a given bit length, e.g., a 3-bit length. Except the 3-bit word counter in each word except the leading word in the frame, and the 6-bit parity in each word, all the remaining bits are data bits.

FIG. 20 illustrates a case where one frame consists of one word, another case where one frame consists of two words, and yet another case where one frame consists of three words.

Although the modified IMES signal to be transmitted from each of the indoor transmitters 200-1 to 200-6 is standardized with the satellite positioning signal in terms of a word structure, it is different from the satellite positioning signal in terms of the number of words making up one frame. Specifically, one frame of the modified IMES signal consists of a plurality of words wherein the number of the words is less than that of words included in one frame of the satellite positioning signal.

(3-5) Preamble

The 8-bit preamble provided in a leading end of the 1st word in each frame has a given bit pattern.

This preamble assists the identification of the frame delimiter. Differently from a bit pattern of a preamble of the satellite positioning signal, the bit pattern of the preamble of the modified IMES signal is configured to allow the modified IMES signal to be distinguished from the satellite positioning signal of the GPS or QZSS.

(3-7) Message-Type ID (MID)

The 3-bit message-type ID (MID) provided after the preamble of the 1st word in each frame indicates a frame length and a content of a frame including the 1st word.

A comparison between a value of the MID and a frame length/content in the modified IMES signal are the same as those illustrated in FIG. 6.

(3-6-1) Content of Massage (3-6-1-1) Massage-Type ID "000": Position Information 1

When the massage-type ID is "000", the frame length is 3 words, and the frame content is position information.

Figure 21:
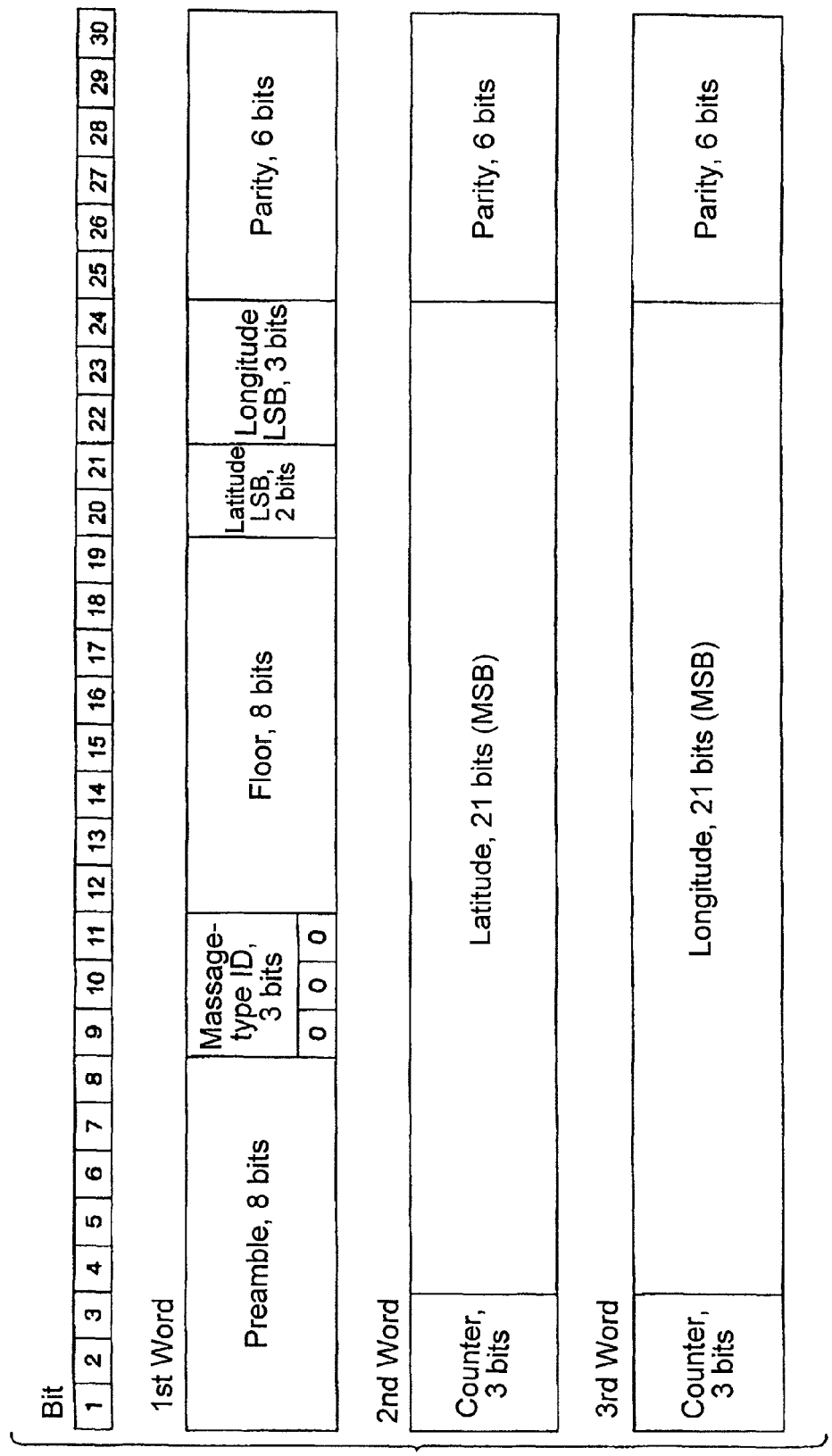
FIG. 21 is a diagram showing a frame structure of the modified IMES signal when the massage-type ID is "000".

FIG. 21 is a diagram showing a frame structure of the modified IMES signal when the massage-type ID is "000". FIG. 22 is a table showing respective examples of data contents in the frame, corresponding values of a bit length and an LSB (Least Significant Bit), and a range to be expressed.

With reference to FIGS. 21 and 22, contents thereof will be described below.

i) Floor Number

The 12th to 19th bits of the 1st word represent a floor number of a building where the indoor transmitter is installed, and a unit thereof is "n-th".

This value has a bit length of 8 bits, and no code. The LSB indicates the 1st floor. An offset of −50th floor is set, and a range of −50th floor to +204th floor is expressed.

ii) Latitude

The 1st to 21st bits of the 2nd word are arranged on the side of an MSB (Most Significant Bit). Total 23 bits obtained by adding the 20th and 21st bits of the 1st word to the 21 bits represent a latitude of the indoor transmitter, and a unit thereof is "degree".

This value has a code. The LSB is in the range of $180/10^{23}$ [degree] to 0.000021 [degree], which represents −90 degrees to +90 degrees. It is equivalent to about 2.4 m in a north-south direction.

iii) Longitude

The 1st to 21st bits of the 3rd word are arranged on the side of an MSB. Total 24 bits obtained by adding the 22nd to 24th bits of the 1st word to the 21 bits represent a longitude of the indoor transmitter, and a unit thereof is "degree".

This value has a code. The LSB is in the range of $360/10^{24}$ [degree] to 0.000021 [degree], which represents −180 degrees to +180 degrees. It is equivalent to about 2.4 m in an east-west direction on the equator.

(3-6-1-2) Massage-Type ID "001": Position Information 2

When the massage-type ID is "001", the frame length is 4 words, and the frame content is position information.

Figure 23:
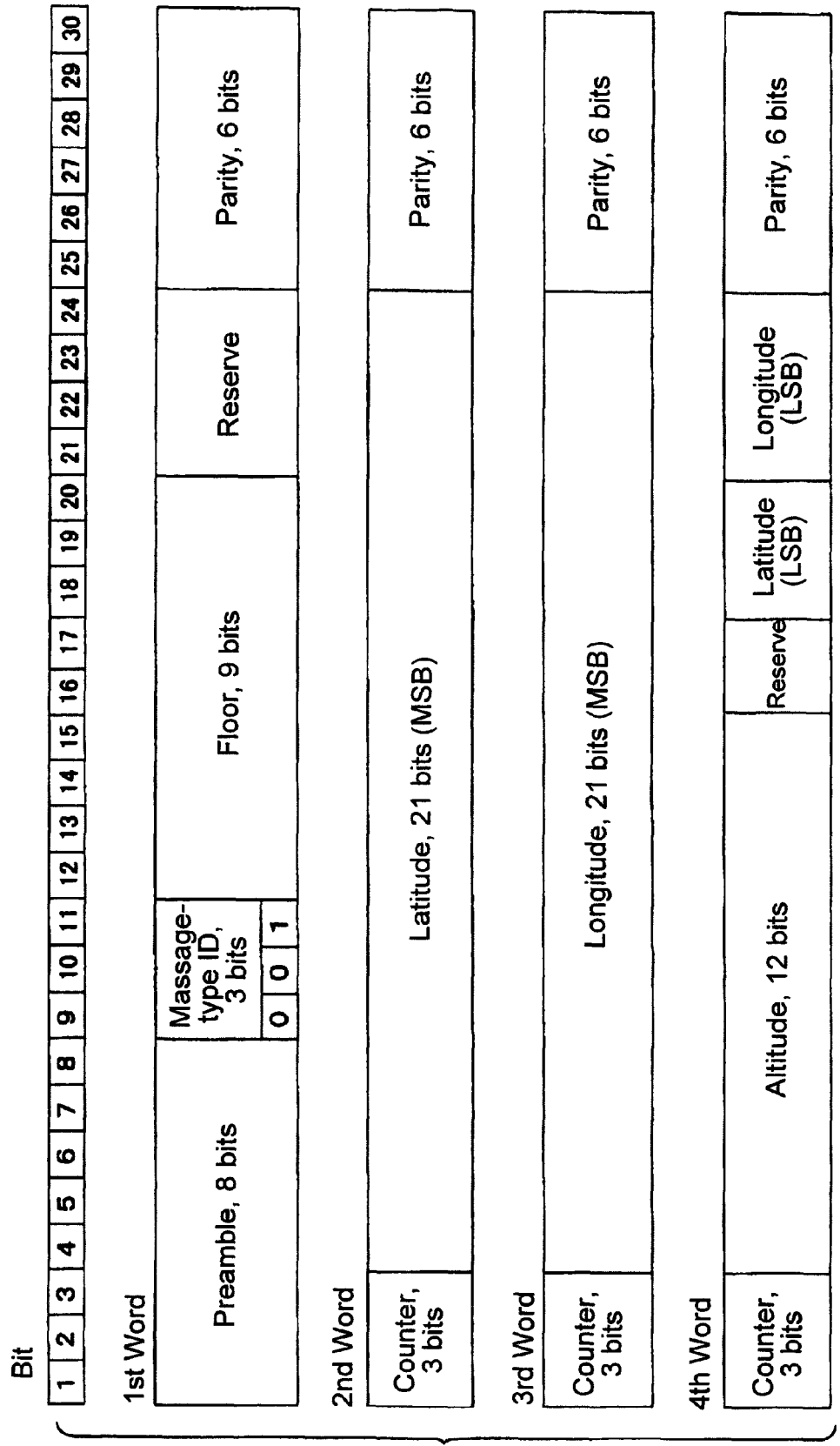
FIG. 23 is a diagram showing a frame structure when the massage-type ID is "001".

FIG. 23 is a diagram showing a frame structure when the massage-type ID is "001".

FIG. 24 is a table showing respective examples of data contents in the frame, corresponding values of a bit length and an LSB, and a range to be expressed.

With reference to FIGS. 23 and 24, contents thereof will be described below.

i) Floor Number

The 12th to 20th bits of the 1st word represent a floor number of a building where the indoor transmitter is installed, and a unit thereof is "n-th".

This value has a bit length of 9 bits, and no code. The LSB indicates the 0.5-th floor. An offset of −50th floor is set, and a range of −50th floor to +205th floor is expressed.

ii) Latitude

The 4th to 24th bits of the 2nd word are arranged on the side of an MSB. Total 24 bits obtained by adding the 18th to 20th bits of the 4th word to the 21 bits represent a latitude of the indoor transmitter, and a unit thereof is "degree".

This value has a code. The LSB is in the range of $180/10^{24}$ [degree] to 0.000011 [degree], which represents −90 degrees to +90 degrees. It is equivalent to about 1.2 m in a north-south direction.

iii) Longitude

The 4th to 24th bits of the 3rd word are arranged on the side of an MSB. Total 25 bits obtained by adding the 21st to 24th bits of the 4th word to the 21 bits represent a longitude of the indoor transmitter, and a unit thereof is "degree".

This value has a code. The LSB is in the range of $360/10^{25}$ [degree] to 0.000011 [degree], which represents −180 degrees to +180 degrees. It is equivalent to about 1.2 m in an east-west direction on the equator.

iv) Altitude

The 1st to 12th bits of the 4th word represent an altitude of the indoor transmitter, and a unit thereof is "m (meter)".

This value has no code. The LSB indicates 1 m. An offset of −95 m is set, and a range of −95 m to +4000 m is expressed.

(3-6-1-3) Massage-Type ID "011": Short ID

When the massage-type ID is "011", the frame length is 1 word, and the frame content is a short ID ($ID_S$).

Figure 25:
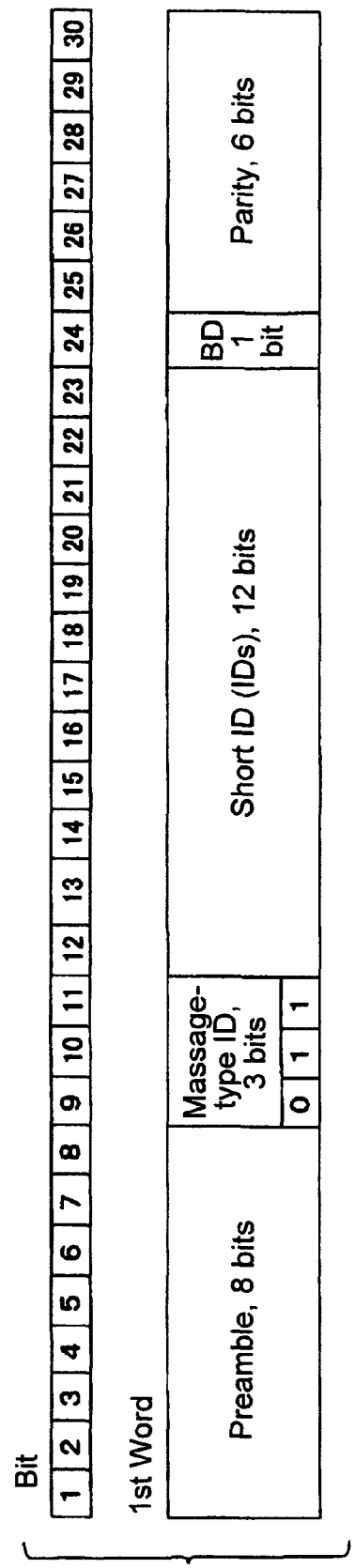
FIG. 25 is a diagram showing a frame structure when the massage-type ID is "011".

FIG. 25 is a diagram showing a frame structure when the massage-type ID is "011".

In a frame corresponding to the short ID, a 12-bit short ID message is transmitted. This frame includes the "outdoor/indoor identification-assist flag" (BD bit).

A content and use of the short ID message are the same as those of the IMES signal described in connation with FIG. 11.

(3-6-1-4) Massage-Type ID "100": Medium ID

When the massage-type ID is "100", the frame length is 2 words, and the frame content is a medium ID ($ID_M$).

Figure 26:
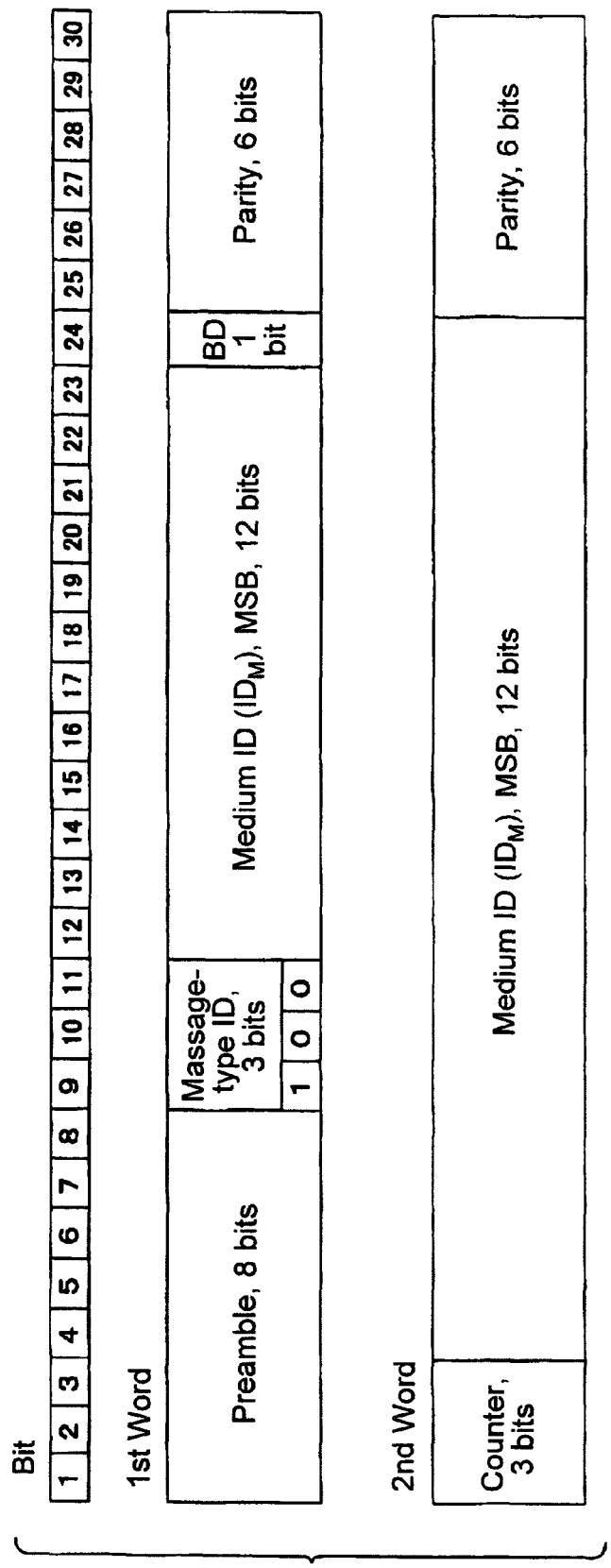
FIG. 26 is a diagram showing a frame structure when the massage-type ID is "100".

FIG. 26 is a diagram showing a frame structure when the massage-type ID is "100".

In a frame corresponding to the medium ID, a 12-bit medium ID message and a 21-bit medium ID message are transmitted. This frame also includes the "outdoor/indoor identification-assist flag" (BD bit).

A content and use of the medium ID message are the same as those of the IMES signal described in connation with FIG. 12.

Thus, the position information providing apparatus (e.g., a mobile phone) 100-5 is operable, in response to receiving the short ID message and the medium ID message, to send an inquiry about position-related information corresponding to the messages, to the local server 204 via a communication network, so as to acquire the position-related information.

As described above, according to the embodiments of the present invention, at least one of the following effects i) to v) can be obtained depending on the embodiments.

i) Standardization with GPS C/A Signal

Hardware configurations of channels for receiving indoor and outdoor (satellite) signals can be standardized, so that it becomes possible to eliminate a need for providing dedicated channels for the indoor and outdoor signals. Thus, channels for searching/capturing/tracking the indoor and outdoor signals can be more easily switched. A receiver resource can be efficiently used, which is advantageous for a portable apparatus having significant restrictions on power consumption, such as a mobile phone.

ii) Reduction of TTRM (Time To Read Message)

It becomes possible to reduce a time from pushing of a position-information acquisition button by a user through until position information is acquired.

iii) Flexibility Depending on Intended Use

A conventional fixed format of a navigation message of the satellite positioning signal (e.g., GPS C/A signal) is modified to allow a leading word in a frame to have an identification information (massage-type ID) having a given bit, so that a it becomes possible to allow a transmitter installation personnel to set a content and a transmission order/frequency of a message to be transmitted, depending on the intended use/purpose.

iv) Ensuring of High Reliability of Indoor Position Information (Prevention of Erroneous Synchronization)

A possibility of output of erroneous position information due to erroneous frame synchronization can be eliminated by performing frame synchronization according a scheme of the present invention. While reliable acquisition of position information is required for notification of position information during emergency messaging, the reliability of an indoor position determination scheme can be improved by employing the scheme of the present invention.

v) Ensuring of High Reliability of Indoor Position Information (Prevention of Erroneous Capture)

A process of the present invention to be performed during receiving of the conventional satellite positioning signal (e.g., GPS C/A signal) makes it possible to recognize erroneous capture based on extraction of an initial bit in a frame synchronization process, and a preamble search.

It should be understood that the above embodiments have been shown and described only by way of illustration, but the description is not meant to be construed in a limiting sense. Accordingly, the scope of the invention should be determined by the following claims and their legal equivalents, instead of the above description, and it is intended that all changes and modifications made within the scope are included therein.

The invention claimed is:

1. A position information providing system capable of providing position information by use of a first positioning signal which is a spread spectrum signal from each of a plurality of satellites, comprising an indoor transmitter, and a position information providing apparatus, wherein:

the indoor transmitter includes:

a storage section which stores therein position data for identifying an installation location of the indoor transmitter, a generation section for generating an second positioning signal including the position data, as a spread spectrum signal, and a transmitting section for transmitting the generated spread spectrum signal; and the position information providing apparatus includes:

a receiving section for receiving a spread spectrum signal, an identifying section for, based on a plurality of code patterns related to the first and second positioning signals, identifying one of the code patterns which corresponds to the spread spectrum signal received by the receiving section, a determining section for, based on a signal obtained by demodulating the received spread spectrum signal using the code pattern identified by the identifying section, determining which of the first and second positioning signals is received, a position information-deriving section for deriving position information of the position information providing apparatus, while switching between processing modes depending on a result of the determination, and an output section for outputting the position information derived by the position information-deriving section, wherein the second positioning signal is configured to repeat a same content message in a cycle shorter than that of the first positioning signal, wherein the second positioning signal comprises a plurality of frames each including a one or more words, each of which is a transmission unit of data to be subjected to error detection, and wherein:
the number of the words included in each of the frames is variably set, a leading one of the words in each of the frames includes a preamble for establishing frame synchronization during receiving, the leading one of the words in each of the frames comprises a message-type identification information indicative of the number of the words constituting the frame, and further indicative of whether the frame includes position information or other information, and if the frames include more than one word, the remaining one or more words other than at least the leading word, in each of the frames, include count data which is updated every time the word data is generated.

2. The position information providing system as defined in claim 1, wherein:
the first positioning signal comprises a plurality of first frames each including a plurality of first words each of which is a transmission unit of data to be subjected to error detection, each of the first frames including a first preamble for establishing frame synchronization during receiving; and the second positioning signal comprises a plurality of second frames each including a plurality of second words each of which is a transmission unit of data to be subjected to error detection, each of the second frames including a second preamble for establishing frame synchronization during receiving, and wherein the second preamble has a pattern different from that of the first preamble.

3. The position information providing system as defined in claim 1, wherein the position information-deriving section is operable, when the second positioning signal transmitted from the indoor transmitter, to acquire the position data from a signal obtained through the demodulation, and, when a plurality of the first positioning signals are received without receiving the second positioning signal, to calculate the position information based on the plurality of received spread spectrum signals.

4. The position information providing system as defined in claim 1, wherein:
the position information providing apparatus is adapted to be capable of communicating with a communicating apparatus for providing position-related information associated with identification data, via a communication line; and the position information-deriving section is operable, when the receiving section receives the second positioning signal, to communicate with the communication apparatus based on the identification data to acquire the position-related information associated with the identification data.

5. An indoor transmitter capable of providing position information by use of a first positioning signal which is a spread spectrum signal from each of a plurality of satellites, and a second positioning signal compatible with the first positioning signal, comprising:

a first storage section which stores therein position data for identifying an installation location of the indoor transmitter;

a generation section for generating an second positioning signal including the position data, as a spread spectrum signal; and a transmitting section for transmitting the generated spread spectrum signal, wherein the generation section is adapted to generate the second positioning signal in such a manner as to repeat a same content message in a cycle shorter than that of the first positioning signal, wherein the second positioning signal comprises a plurality of frames each including a one or more words, each of which is a transmission unit of data to be subjected to error detection, and wherein:
the number of the words included in each of the frames is variably set, a leading one of the words in each of the frames includes a preamble for establishing frame synchronization during receiving, the leading one of the words in each of the frames comprises a message-type identification information indicative of the number of the words constituting the frame, and further indicative of whether the frame includes position information or other information, and if the frames include more than one word, the remaining one or more words other than at least the leading word, in each of the frames, include count data which is updated every time the word data is generated.

6. The indoor transmitter as defined in claim 5, wherein:
the first positioning signal comprises a plurality of first frames each including a plurality of first words each of which is a transmission unit of data to be subjected to error detection, each of the first frames including a first preamble for establishing frame synchronization during receiving; and the second positioning signal comprises a plurality of second frames each including a plurality of second words each of which is a transmission unit of data to be subjected to error detection, each of the second frames including a second preamble for establishing frame synchronization during receiving, and wherein the second preamble has a pattern different from that of the first preamble.

7. The indoor transmitter as defined in claim 5, wherein the generation section includes identification data associated with position-related information.

8. The indoor transmitter as defined in claim 5, wherein:
the first positioning signal comprises a plurality of first frames each including a plurality of first words each of which is a transmission unit of data to be subjected to error detection, each of the first frames including a first preamble for establishing frame synchronization during receiving; and the second positioning signal comprises a plurality of second frames each including a plurality of second words each of which is a transmission unit of data to be subjected to error detection, each of the second frames including a second preamble for establishing frame synchronization during receiving, and wherein the second preamble has a pattern different from that of the first preamble.

9. A method of providing position information by use of a first positioning signal which is a spread spectrum signal from each of a plurality of satellites, comprising:

the step of loading position data for identifying an installation location of an indoor transmitter;

the step of generating an second positioning signal including the position data, as a spread spectrum signal;

the step of transmitting the generated spread spectrum signal;

the step of receiving the transmitted spread spectrum signal;

the step of, based on a plurality of code patterns related to the first and second positioning signals, identifying one of the code patterns which corresponds to the received spread spectrum signal;

the step of, based on a signal obtained by demodulating the received spread spectrum signal using the identified code pattern, determining which of the first and second positioning signals is received;

the step of deriving position information, while switching between processing modes depending on a result of the determination; and the step of outputting the derived position information, wherein the second positioning signal is generated to repeat a same content message in a cycle shorter than that of the first positioning signal, wherein the second positioning signal comprises a plurality of frames each including a one or more words, each of which is a transmission unit of data to be subjected to error detection, and wherein:

the number of the words included in each of the frames is variably set, a leading one of the words in each of the frames includes a preamble for establishing frame synchronization during receiving, the leading one of the words in each of the frames comprises a message-type identification information indicative of the number of the words constituting the frame, and further indicative of whether the frame includes position information or other information, and if the frames include more than one word, the remaining one or more words other than at least the leading word, in each of the frames, include count data which is updated every time the word data is generated.

10. The method as defined in claim 9, wherein:

the first positioning signal comprises a plurality of first frames each including a plurality of first words each of which is a transmission unit of data to be subjected to error detection, each of the first frames including a first preamble for establishing frame synchronization during receiving; and the second positioning signal comprises a plurality of second frames each including a plurality of second words each of which is a transmission unit of data to be subjected to error detection, each of the second frames including a second preamble for establishing frame synchronization during receiving, and wherein the second preamble has a pattern different from that of the first preamble.

11. The method as defined in claim 10, wherein the step of deriving includes the sub-step of, when the second positioning signal transmitted from the indoor transmitter, acquiring the position data from a signal obtained through the demodulation, and the sub-step of, when a plurality of the first positioning signals are received without receiving the second positioning signal, calculating the position information based on the plurality of received spread spectrum signals.

12. The method as defined in claim 9, wherein the step of deriving includes the sub-step of, when the second positioning signal transmitted from the indoor transmitter, acquiring the position data from a signal obtained through the demodulation, and the sub-step of, when a plurality of the first positioning signals are received without receiving the second positioning signal, calculating the position information based on the plurality of received spread spectrum signals.

* * * * *